(12) United States Patent
Kuempel et al.

(10) Patent No.: US 7,708,797 B2
(45) Date of Patent: May 4, 2010

(54) AIR CLEANER CONFIGURED FOR RECEIPT OF VARIOUS SIZED FILTER CARTRIDGES; COMPONENTS THEREOF; AND, METHODS

(75) Inventors: Bradley A. Kuempel, Eden Prairie, MN (US); Richard J. Osendorf, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 12/087,819

(22) PCT Filed: Jan. 19, 2007

(86) PCT No.: PCT/US2007/001476

§ 371 (c)(1),
(2), (4) Date: Nov. 24, 2008

(87) PCT Pub. No.: WO2007/084689

PCT Pub. Date: Jul. 26, 2007

(65) Prior Publication Data

US 2009/0090091 A1  Apr. 9, 2009

Related U.S. Application Data

(60) Provisional application No. 60/760,559, filed on Jan. 20, 2006.

(51) Int. Cl.
*B01D 46/00* (2006.01)
(52) U.S. Cl. ............................. 55/521; 55/357; 55/480; 55/481; 55/498; 55/502

(58) Field of Classification Search .................... 55/356, 55/357, 478, 480, 481, 498, 502, 503, 506, 55/521
See application file for complete search history.

(56) References Cited

U.S. PATENT DOCUMENTS

| | | | |
|---|---|---|---|
| 991,572 | A | 5/1911 | Weisenstein |
| 1,079,042 | A | 11/1913 | Duncan |
| 1,103,717 | A | 7/1914 | Walton et al. |
| 1,942,600 | A | 1/1934 | Hornung |
| 2,074,294 | A | 3/1937 | Woodruff |
| 2,599,604 | A | 6/1952 | Bauer et al. |
| 2,887,177 | A | 5/1959 | Mund et al. |
| 2,890,796 | A | 6/1959 | Blood |
| 2,914,785 | A | 12/1959 | Ela |

(Continued)

FOREIGN PATENT DOCUMENTS

CA  997684  9/1976

(Continued)

OTHER PUBLICATIONS

U.S. Appl. No. 09/258,481, filed Feb. 26, 1999.

(Continued)

*Primary Examiner*—Michael A Marcheschi
*Assistant Examiner*—Robert A Clemente
(74) *Attorney, Agent, or Firm*—Merchant + Gould P.C.

(57) ABSTRACT

An air cleaner assembly is provided, which is configured for alternate installation therein of different sized filter cartridges. Features of the air cleaner assembly and components for use therewith, are described. Also methods of assembly and use are described.

15 Claims, 29 Drawing Sheets

U.S. PATENT DOCUMENTS

| | | |
|---|---|---|
| 2,942,127 A | 6/1960 | Harse |
| 3,019,854 A | 3/1962 | O'Bryant |
| 3,025,963 A | 3/1962 | Bauer |
| 3,209,917 A | 10/1965 | Yelinek |
| 3,442,067 A | 5/1969 | Swenson |
| 3,494,113 A | 2/1970 | Kinney |
| 3,676,242 A | 7/1972 | Prentice |
| 3,695,437 A | 10/1972 | Shaltis |
| 3,740,933 A | 6/1973 | Hollowell |
| 3,807,150 A | 4/1974 | Maracle |
| 3,841,953 A | 10/1974 | Kohkamp et al. |
| 3,489,241 A | 11/1974 | Butin et al. |
| 3,878,014 A | 4/1975 | Melead |
| 3,878,041 A | 4/1975 | Melead |
| 3,912,631 A | 10/1975 | Turman |
| 4,018,580 A | 4/1977 | Bürkholz et al. |
| 4,065,341 A | 12/1977 | Cub |
| 4,158,449 A | 6/1979 | Sun et al. |
| 4,159,899 A | 7/1979 | Deschenes |
| 4,162,906 A | 7/1979 | Sullivan et al. |
| 4,192,906 A | 3/1980 | Maru et al. |
| 4,236,902 A | 12/1980 | Fricke |
| 4,255,175 A | 3/1981 | Wilkins |
| 4,282,186 A | 8/1981 | Nonnenmann et al. |
| 4,285,909 A | 8/1981 | Mizusawa et al. |
| 4,310,419 A | 1/1982 | Nara et al. |
| 4,322,231 A | 3/1982 | Hilzendeger et al. |
| 4,394,147 A | 7/1983 | Caddy et al. |
| 4,402,830 A | 9/1983 | Pall |
| 4,410,427 A | 10/1983 | Wydeven |
| 4,430,223 A | 2/1984 | Miyakawa et al. |
| 4,449,993 A | 5/1984 | Bergeron |
| 4,480,359 A | 11/1984 | Koster |
| 4,498,989 A | 2/1985 | Miyakawa et al. |
| 4,537,608 A | 8/1985 | Koslow |
| 4,578,091 A | 3/1986 | Borja |
| 4,589,983 A | 5/1986 | Wydeven |
| 4,617,176 A | 10/1986 | Merry |
| 4,678,489 A | 7/1987 | Bertelsen |
| 4,704,143 A | 11/1987 | Percy |
| 4,720,292 A | 1/1988 | Engel et al. |
| 4,759,783 A | 7/1988 | Machado |
| 4,767,531 A | 8/1988 | Holzer |
| 4,783,029 A | 11/1988 | Geppert et al. |
| 4,824,564 A | 4/1989 | Edwards et al. |
| 4,925,469 A | 5/1990 | Clement et al. |
| 4,925,561 A | 5/1990 | Ishii et al. |
| 4,963,170 A | 10/1990 | Weber et al. |
| 4,999,038 A | 3/1991 | Matsumoto et al. |
| 5,013,182 A | 5/1991 | Coulvonvaux et al. |
| 5,030,264 A | 7/1991 | Klotz et al. |
| 5,049,326 A | 9/1991 | Matsumoto et al. |
| 5,069,790 A | 12/1991 | Mordeki |
| 5,082,476 A | 1/1992 | Kahlbaugh et al. |
| 5,125,941 A | 6/1992 | Ernst et al. |
| 5,174,895 A | 12/1992 | Drori |
| 5,211,846 A | 5/1993 | Kott et al. |
| 5,213,596 A | 5/1993 | Kume et al. |
| 5,238,474 A | 8/1993 | Kahlbaugh et al. |
| 5,304,312 A | 4/1994 | Forster et al. |
| 5,350,515 A | 9/1994 | Stark et al. |
| 5,415,677 A | 5/1995 | Ager et al. |
| 5,435,870 A | 7/1995 | Takagaki et al. |
| 5,472,463 A | 12/1995 | Herman et al. |
| 5,484,466 A | 1/1996 | Brown et al. |
| 5,487,767 A | 1/1996 | Brown |
| 5,494,497 A | 2/1996 | Lee |
| 5,536,290 A | 7/1996 | Stark et al. |
| 5,543,007 A | 8/1996 | Takagaki et al. |
| 5,547,480 A | 8/1996 | Coulonvaux |
| 5,569,311 A | 10/1996 | Oda et al. |
| 5,582,146 A | 12/1996 | Linsbauer et al. |
| 5,601,717 A | 2/1997 | Villette et al. |
| 5,611,922 A | 3/1997 | Stene |
| 5,613,992 A | 3/1997 | Engel |
| 5,645,718 A | 7/1997 | Hardison et al. |
| 5,672,399 A | 9/1997 | Kahlbaugh et al. |
| 5,683,660 A | 11/1997 | Wirth et al. |
| 5,685,985 A | 11/1997 | Brown et al. |
| 5,690,712 A | 11/1997 | Engel |
| 5,714,126 A | 2/1998 | Frund |
| 5,730,766 A | 3/1998 | Clements |
| 5,730,768 A | 3/1998 | Kaminaga et al. |
| 5,740,774 A | 4/1998 | Kennedy |
| 5,755,843 A | 5/1998 | Sundquist |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| 5,800,587 A | 9/1998 | Kahlbaugh et al. |
| 5,820,646 A * | 10/1998 | Gillingham et al. ........... 55/488 |
| 5,863,313 A | 1/1999 | Coulonvaux |
| 5,895,574 A | 4/1999 | Friedmann et al. |
| 5,897,676 A | 4/1999 | Engel |
| 5,902,364 A | 5/1999 | Tokar et al. |
| 5,908,480 A | 6/1999 | Ban et al. |
| 5,951,729 A | 9/1999 | Ernst et al. |
| D416,308 S | 11/1999 | Ward et al. |
| D417,268 S | 11/1999 | Gillingham |
| 6,007,169 A | 12/1999 | Li et al. |
| 6,048,386 A | 4/2000 | Gillingham et al. |
| D425,189 S | 5/2000 | Gillingham et al. |
| 6,149,700 A | 11/2000 | Morgan et al. |
| 6,179,890 B1 | 1/2001 | Ramos et al. |
| 6,190,432 B1 * | 2/2001 | Gieseke et al. ............. 55/385.3 |
| 6,231,630 B1 | 5/2001 | Ernst et al. |
| 6,235,195 B1 | 5/2001 | Tokar |
| 6,264,713 B1 | 7/2001 | Lewis |
| 6,296,025 B1 | 10/2001 | Gregg et al. |
| 6,299,661 B1 | 10/2001 | Bloomer et al. |
| 6,322,602 B2 | 11/2001 | Engel et al. |
| 6,348,084 B1 | 2/2002 | Gieseke et al. |
| 6,348,085 B1 | 2/2002 | Tokar et al. |
| 6,350,291 B1 * | 2/2002 | Gieseke et al. ............. 55/385.3 |
| 6,368,374 B1 | 4/2002 | Tokar et al. |
| D461,003 S | 7/2002 | Gieseke et al. |
| 6,517,598 B2 | 2/2003 | Anderson et al. |
| 6,572,667 B1 | 6/2003 | Greif et al. |
| 6,585,792 B2 | 7/2003 | Schneider et al. |
| 6,598,580 B2 | 7/2003 | Baumann et al. |
| 6,610,117 B2 * | 8/2003 | Gieseke et al. ............. 55/385.3 |
| 6,610,126 B2 | 8/2003 | Xu et al. |
| D483,459 S | 12/2003 | DeWit et al. |
| 6,673,136 B2 * | 1/2004 | Gillingham et al. ........... 95/273 |
| 6,743,317 B2 | 6/2004 | Wydeven |
| 6,783,565 B2 | 8/2004 | Gieseke et al. |
| 6,878,190 B1 * | 4/2005 | Xu et al. ....................... 95/273 |
| 6,953,124 B2 | 10/2005 | Winter et al. |
| 6,966,940 B2 | 11/2005 | Krisko et al. |
| 6,974,490 B2 * | 12/2005 | Gillingham et al. ........... 55/486 |
| 6,997,968 B2 * | 2/2006 | Xu et al. ....................... 55/495 |
| 7,004,986 B2 | 2/2006 | Kopec et al. |
| 7,090,712 B2 * | 8/2006 | Gillingham et al. ........... 55/486 |
| 7,097,694 B1 | 8/2006 | Jaroszczyk et al. |
| 7,211,124 B2 | 5/2007 | Gieseke et |
| 7,255,300 B2 | 8/2007 | Johnston |
| 7,318,851 B2 | 1/2008 | Brown et al. |
| 7,323,029 B2 | 1/2008 | Engelland et al. |
| 7,351,270 B2 | 4/2008 | Engelland et al. |
| 7,396,375 B2 * | 7/2008 | Nepsund et al. ................ 55/481 |
| 2001/0003893 A1 | 6/2001 | Ramos et al. |
| 2001/0037631 A1 | 11/2001 | Morgan et al. |
| 2002/0112458 A1 | 8/2002 | Schneider et al. |
| 2002/0184864 A1 | 12/2002 | Bishop et al. |

| | | | | | | |
|---|---|---|---|---|---|---|
| 2002/0185007 | A1 | 12/2002 | Xu et al. | EP | 1 509 311 B1 | 1/2007 |
| 2004/0020177 | A1 | 2/2004 | Ota et al. | EP | 1 258 278 | 1/2008 |
| 2004/0173097 | A1 | 9/2004 | Engelland et al. | FR | 2 034 160 | 12/1970 |
| 2004/0221555 | A1 | 11/2004 | Engelland et al. | GB | 703823 | 2/1954 |
| 2005/0081497 | A1 | 4/2005 | Connor | GB | 1275651 | 5/1972 |
| 2006/0081528 | A1 | 4/2006 | Oelpke et al. | JP | S58-151417 | 3/1982 |
| 2006/0090431 | A1 | 5/2006 | Brown | JP | S60-155921 | 3/1984 |
| 2006/0090434 | A1 | 5/2006 | Brown et al. | JP | 59-170669 | 11/1984 |
| 2006/0091061 | A1 | 5/2006 | Brown | JP | 60-112320 | 7/1985 |
| 2006/0091064 | A1 | 5/2006 | Brown et al. | JP | H02-48118 | 9/1988 |
| 2006/0091084 | A1 | 5/2006 | Merritt et al. | JP | 1-11971 | 4/1989 |
| 2006/0101999 | A1 | 5/2006 | Steins | JP | 01 171615 A | 10/1989 |
| 2006/0121768 | A1 | 6/2006 | Dworatzek et al. | JP | 63-122617 | 6/1998 |
| 2006/0123754 | A1 | 6/2006 | Oelpke et al. | JP | H02-48117 | 9/1998 |
| 2006/0151655 | A1 | 7/2006 | Johnston | WO | 88/03432 | 5/1988 |
| 2006/0163150 | A1 | 7/2006 | Golden | WO | WO 88/03431 | 5/1988 |
| 2007/0006560 | A1 | 1/2007 | Ruhland et al. | WO | 97/40908 | 11/1997 |
| 2007/0169449 | A1 | 7/2007 | Merritt | WO | 97/40910 | 11/1997 |
| 2007/0186527 | A1 | 8/2007 | Lampert et al. | WO | 97/40917 | 11/1997 |
| 2007/0186528 | A1 | 8/2007 | Wydeven et al. | WO | WO 97/40918 | 11/1997 |
| 2007/0193236 | A1 | 8/2007 | Merritt | WO | WO 97/41939 | 11/1997 |
| 2007/0261662 | A1 | 11/2007 | Lampert et al. | WO | WO 97/45200 | 12/1997 |
| 2008/0011896 | A1 | 1/2008 | Johnston et al. | WO | WO 98/35144 | 8/1998 |
| 2008/0022641 | A1 | 1/2008 | Engelland et al. | WO | WO 99/37381 | 7/1999 |
| 2008/0060329 | A1 | 3/2008 | Brown et al. | WO | WO 99/47237 | 9/1999 |
| 2008/0066434 | A1 | 3/2008 | Kuempel et al. | WO | WO 00/50149 | 8/2000 |
| 2008/0086990 | A1 | 4/2008 | Kuempel et al. | WO | WO 00/74818 | 12/2000 |
| 2008/0115470 | A1 | 5/2008 | Kuempel et al. | WO | 02/49741 A1 | 6/2002 |
| 2008/0135470 | A1 | 6/2008 | Merritt et al. | WO | WO 03/084641 | 2/2003 |
| 2008/0250763 | A1 | 10/2008 | Widerski et al. | WO | WO 03/095068 | 11/2003 |
| 2008/0271423 | A1* | 11/2008 | Nepsund et al. ............ 55/481 | WO | WO 03/095068 A1 | 11/2003 |
| 2009/0090091 | A1 | 4/2009 | Kuempel et al. | WO | WO 2004/007054 | 1/2004 |

FOREIGN PATENT DOCUMENTS

| | | |
|---|---|---|
| DE | 3405719 A1 | 8/1985 |
| DE | 2155522 | 5/1993 |
| DE | 40 31 014 C2 | 11/1993 |
| DE | 44 15 890 A1 | 11/1995 |
| DE | 102 22 800 | 12/2003 |
| EP | 0 376 443 A2 | 7/1990 |
| EP | 0 486 276 A1 | 5/1992 |
| EP | 0 492 250 | 7/1992 |
| EP | 0 529 921 | 3/1993 |
| EP | 0 581 695 | 2/1994 |
| EP | 0 704 233 A1 | 4/1996 |
| EP | 0 726 389 | 8/1996 |
| EP | 0 738 528 | 10/1996 |
| EP | 0897317 | 7/2000 |
| EP | 1 159 052 B1 | 11/2003 |
| EP | 1 364 695 | 11/2003 |
| EP | 1 364 695 A1 | 11/2003 |
| EP | 1 169 109 B1 | 4/2004 |
| EP | 1 731 749 A1 | 12/2006 |
| WO | WO 2004/020075 A2 | 3/2004 |
| WO | WO 2005/046841 | 5/2005 |
| WO | WO 2005/079954 | 9/2005 |
| WO | WO 2006/009766 | 1/2006 |
| WO | WO 2007/000397 A1 | 4/2007 |
| WO | WO 2007/044677 | 4/2007 |

OTHER PUBLICATIONS

U.S. Appl. No. 09/502,346, filed Feb. 10, 2000.
U.S. Appl. No. 10/055,062, filed Jan. 22, 2002.
U.S. Appl. No. 10/914,510, filed Aug. 9, 2004.
U.S. Appl. No. 11/999,246, filed Dec. 3, 2007.
Claims responding to U.S. Appl. No. 11/625,096.
Claims corresponding to U.S. Appl. No. 11/821,389.
Claims corresponding to U.S. Appl. No. 11/821,378.
Search Report and Written Opinion corresponding to PCT/US2007/001476.
Amended Claims of U.S. Appl. No. 11/625,096.
Substantive Documents of File History from U.S. Appl. No. 11/625,096.

* cited by examiner

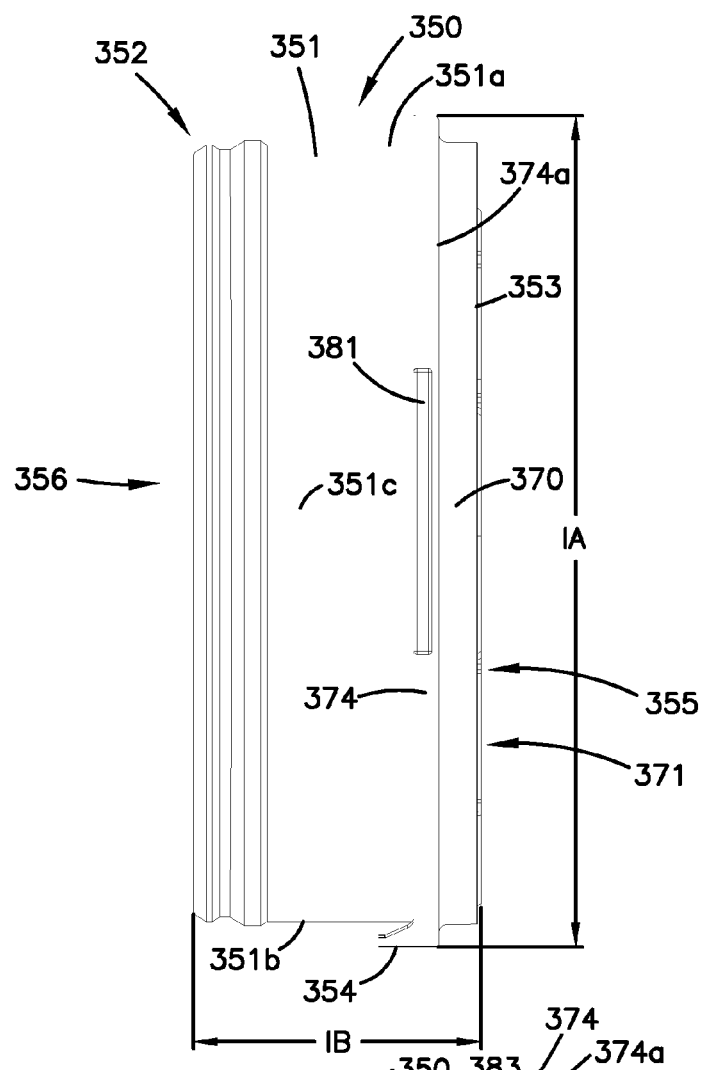
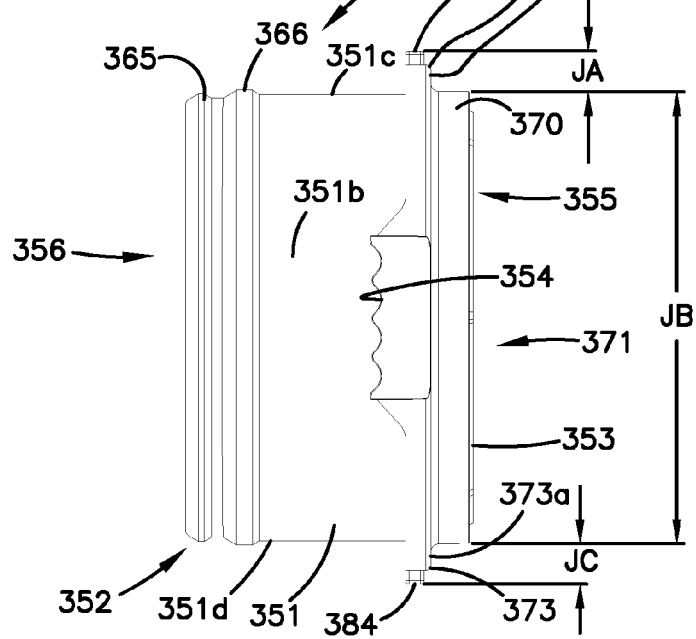
FIG. 18
FIG. 19

AIR CLEANER CONFIGURED FOR RECEIPT OF VARIOUS SIZED FILTER CARTRIDGES; COMPONENTS THEREOF; AND, METHODS

This application is being filed on 19 Jan. 2007 as a PCT International Patent application in the name of Donaldson Company, Inc., a U.S. national corporation, applicant for the designation of all countries except the US, and Bradley A. Kuempel and Richard J. Osendorf, both citizens of the U.S., applicants for the designation of the US only, and claims priority to U.S. Provisional Patent Application No. 60/760,559, filed Jan. 20, 2006.

FIELD OF THE DISCLOSURE

The present disclosure concerns air cleaner for use, for example, for cleaning engine combustion air for vehicles and other equipment. The disclosure provides preferred components, assemblies and methods.

CROSS-REFERENCE TO OTHER APPLICATIONS FOR BACKGROUND

Selected components described herein are improvements in such air cleaner arrangements as those described in U.S. Provisional Application 60/567,121, filed Apr. 30, 2004; U.S. Provisional Application 60/604,549, filed Aug. 25, 2004; U.S. Provisional Application 60/649,301, filed Feb. 1, 2005; and PCT Publication WO 05/107924, published Nov. 17, 2005. Each of these references is incorporated herein by reference.

BACKGROUND

Gas streams often carry particulate material therein. In many instances it is desirable to remove some or all of the particulate material from the gas flow stream. For example, air intake streams to engines for motorized vehicles or power generation equipment often include particulate material therein. The particulate material, should it reach the internal workings of the mechanisms involved, can cause substantial damage. It is therefore preferred, for such systems, to remove the particulate material from the gas flow upstream of the engine or other equipment involved. A variety of air cleaner arrangements have been developed for particulate removal.

There has been a general trend for the utilization of air cleaner arrangements that utilize, as a media pack, z-filter media constructions. In general z-filter media constructions can be characterized as comprising fluted media sheet material secured to a facing media sheet material, formed into a media pack configuration. Examples of z-filter arrangements are described in PCT Publication WO 97/40918, published Nov. 6, 1997; U.S. Pat. Nos. 6,190,432 and 6,350,291; PCT application US 04/07927, filed Mar. 17, 2004; U.S. Provisional application 60/532,783, filed Dec. 22, 2003; PCT Publication 03/095068, published Nov. 20, 2003; PCT publication WO 04/007054, published Jan. 22, 2004; PCT publication WO 03/084641, published Oct. 16, 2003; and, U.S. Provisional Application 60/543,804, filed Feb. 11, 2004; the complete disclosures of each of these cited references being incorporated herein by reference.

With some arrangements, it has been desired to develop configurations in which the z-filter media is loaded into an air cleaner housing through a side (as opposed to an end) of the housing. Such arrangements are described for example in WO 03/095068, incorporated herein by reference.

In general, improvements have been sought.

SUMMARY OF THE DISCLOSURE

The present disclosure concerns air cleaners and componentry therefor. A variety of features and component features are described, for air cleaners and their components, including serviceable filter cartridges. Selected features described herein relate to features in an air cleaner housing facilitating installation, alternatively, of different sized primary filter cartridges; and, features of primary filter cartridges that facilitate installation in such housings.

It is noted that not all of the features described herein must be incorporated in an arrangement, for the arrangement to have some selected advantage according to the present disclosure.

BRIEF DESCRIPTION OF THE DRAWINGS

FIG. 11 being from a view point of a top plan view as the element would appear during a step of insertion.

FIG. 12 depicting the cartridge in a side plan view toward a side facing an installer, during installation.

FIG. 18 is a top plan view of a second, shorter, filter cartridge configured for installation in the air cleaner housing of FIGS. 6-10; the view of FIG. 18 being a top plan view of the cartridge oriented for a step of installation.

FIG. 19 is a side elevational view of the cartridge depicted in FIG. 18; FIG. 19 depicting a view point toward an installer.

DETAILED DESCRIPTION

I. Z-Filter Media Configurations, Generally

Figure 1:
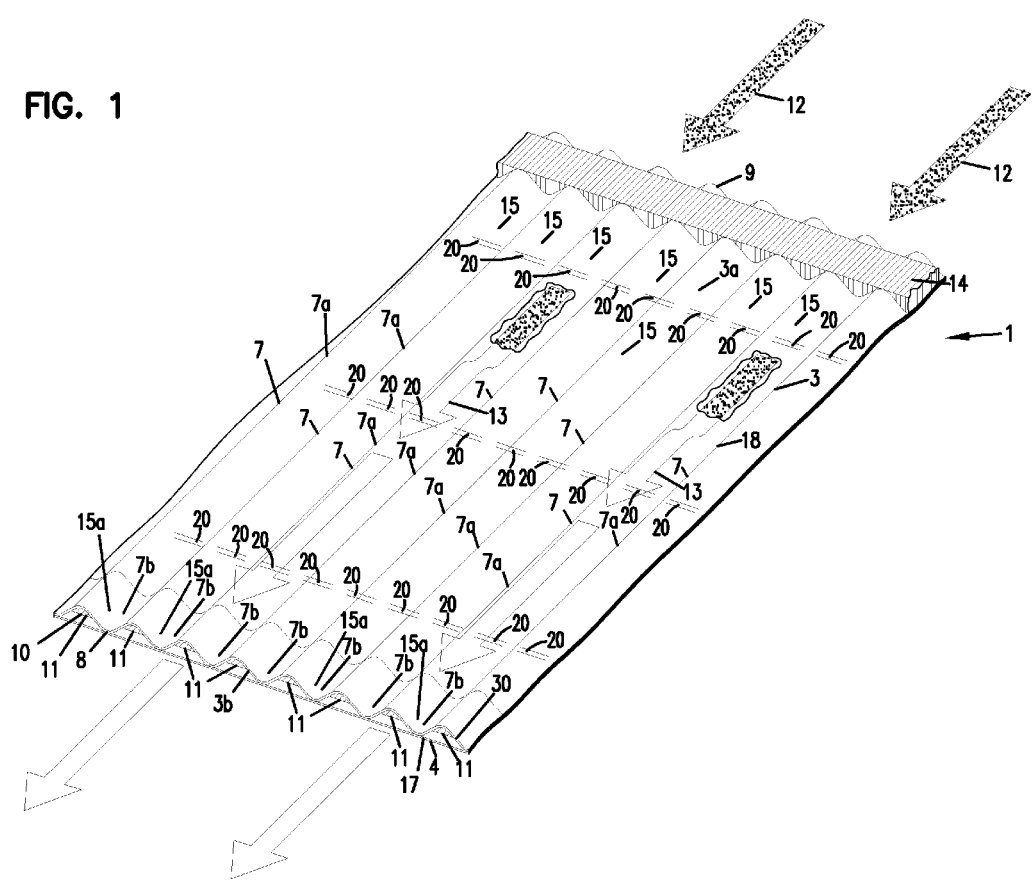
FIG. 1 is a fragmentary, schematic, perspective view of z-filter media useable in arrangements according to the present disclosure.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is described in FIG. 11 of 5,820,646, incorporated herein by reference.

For specific examples described herein below, coiled arrangements are depicted, although many of the principles can be applied with stacked arrangements.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; and/or, such a media coiled or otherwise constructed or formed into a three dimensional network of inlet and outlet flutes; and/or, a filter construction including such media.

In FIG. 1, an example of media 1 useable in z-filter media is shown. The media 1 is formed from a fluted (corrugated) sheet 3 and a facing sheet 4.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
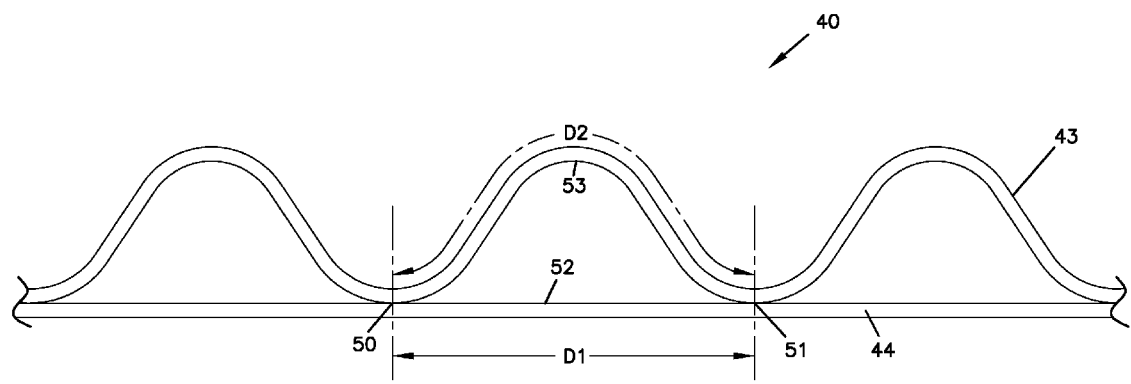
FIG. 2 is a schematic, cross-sectional view of a portion of the media depicted in FIG. 1.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
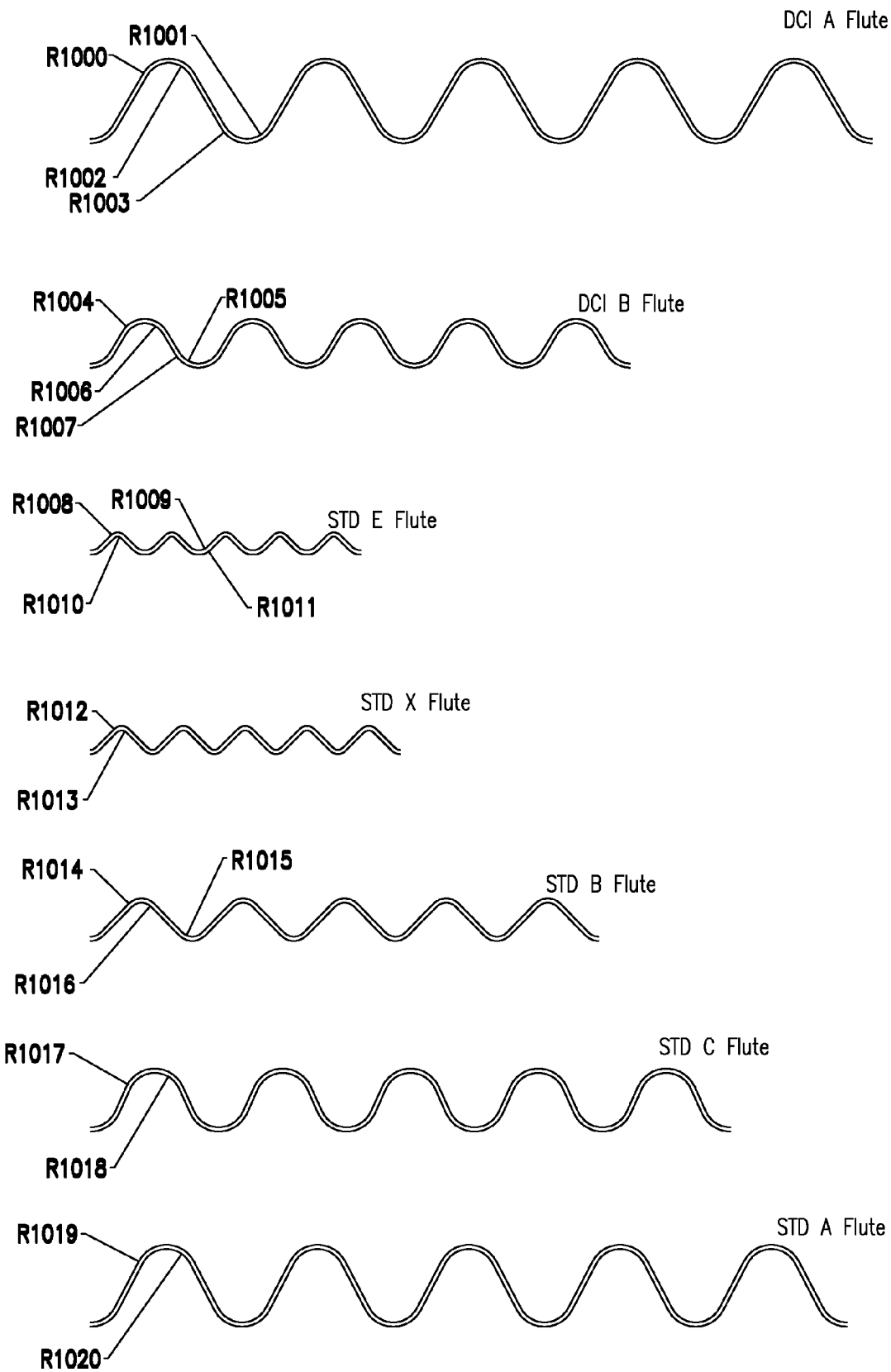
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Coiled Media Configurations Using Fluted Media, Generally

Figure 4:
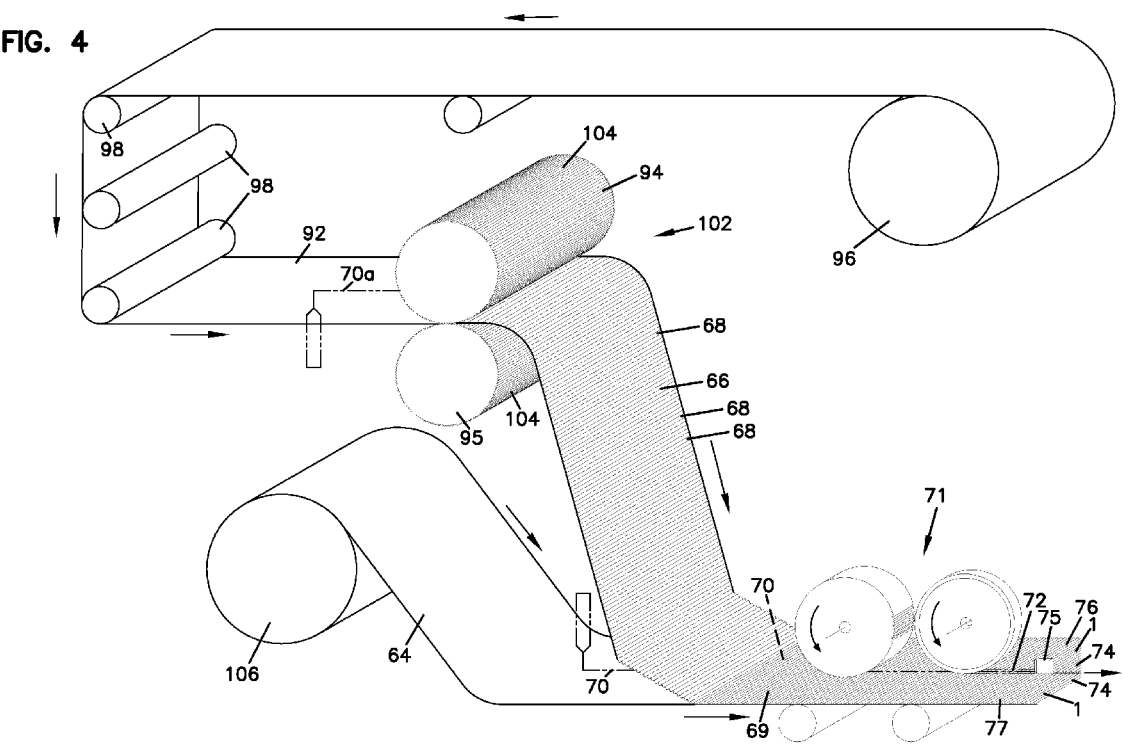
FIG. 4 is a schematic view of a useable process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by some welding).

Referring to FIG. 4, an adhesive line 70 is shown used, to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown, are possible.

Figure 5:
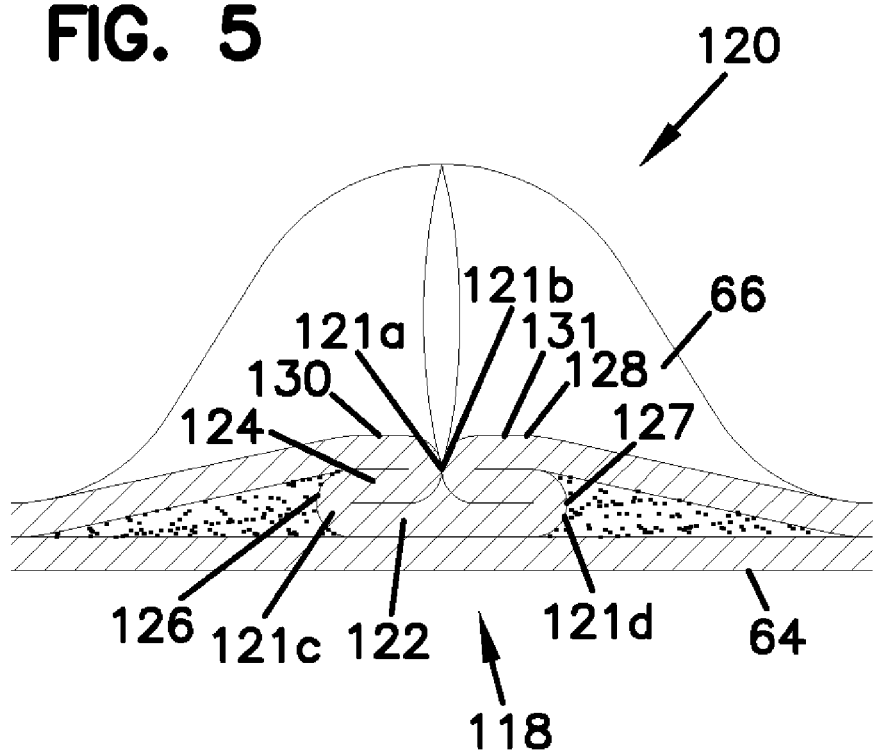
FIG. 5 is a cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Techniques described herein are particularly well adapted for use in media packs that result from coiling a single sheet comprising a corrugated sheet/facing sheet combination, i.e., a "single facer" strip. Certain of the techniques can be applied with arrangements that, instead of being formed by coiling, are formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

III. Improved Air Cleaner Arrangements Utilizing Z-Filter Media

A. General Air Cleaner Features.

Figure 6:
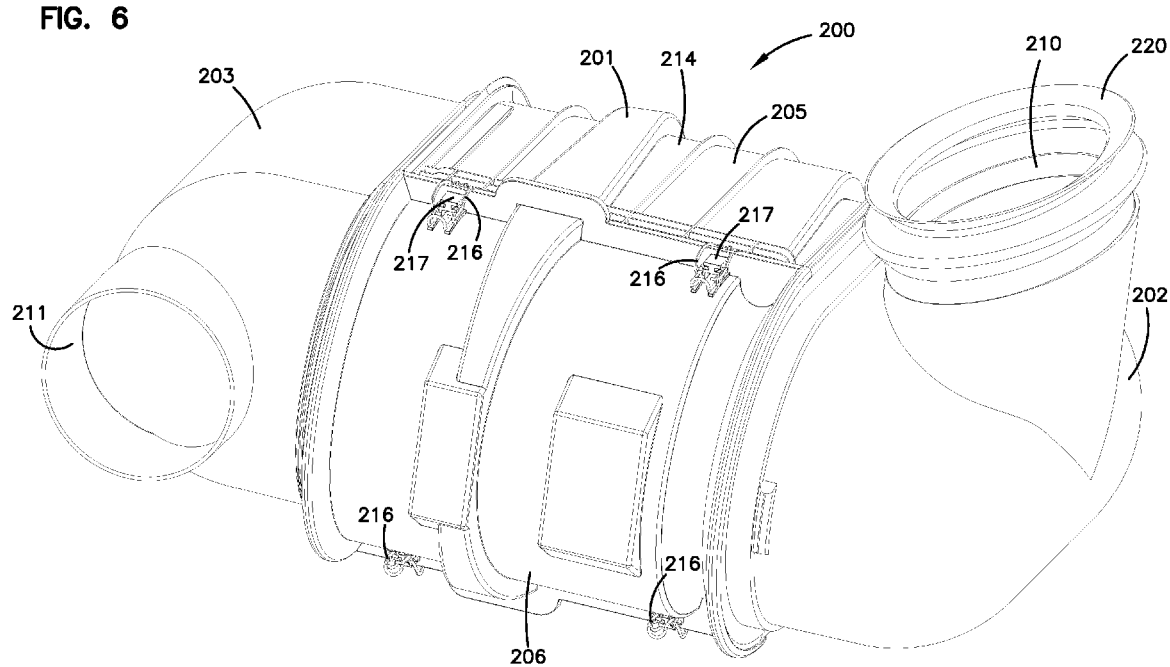
FIG. 6 is a top perspective view of an air cleaner assembly having features according to the present disclosure.

The reference numeral 200, FIG. 6, generally depicts an air cleaner according to the present disclosure. The air cleaner 200 comprises a housing 201 having an inlet section 202, an outlet section 203 and a central region 205 positioned therebetween. The central region 205 includes a removable access cover 206.

In general, the central region 205 defines an installation and receiving space for a primary air filter cartridge or cartridge arrangement, which is serviceable, removable and replaceable. During air cleaner use, air to be filtered: (a) enters the air cleaner 200 through inlet arrangement 210 in inlet section 202; (b) is directed through a primary filter cartridge received within central region 205; and, then, (c) the resulting filtered air is passed into outlet section 203, from which it passes through outlet arrangement 211 into appropriate ductwork into an engine air intake.

The particular air cleaner 200 depicted, would typically be manufactured in modular pieces comprising: the inlet section 202; the outlet section 203; and, the central section 205, comprising base 214 and separable access cover 206. In a typical approach, the parts 202, 203, 206 and 214 can be molded from plastic utilizing a variety of molding techniques. However, alternate materials and approaches to construction can be used with the principles described herein.

Herein the base 214 will sometimes be referred to as a "primary filter cartridge receiving section." The term "primary filter cartridge" in this context, is meant to refer to a serviceable filter cartridge including z-filter media in accord with the general descriptions above, positioned within housing 201 during use. The term "primary filter cartridge" is not meant to include within its scope, any separate safety filters that may be positioned within the housing 201. The term "primary filter cartridge receiving section" is meant to refer to the portion of base 214, in which the primary filter cartridge is positioned, during installation. It is noted that in some instances portions of the primary filter cartridge, during installation, can project out of the primary filter cartridge receiving section 214, for example into cover 206 and as described below, portions of a seal arrangement on the primary filter cartridge may project into the outlet section 203.

As a result of the modular construction, the air cleaner 200 of FIG. 6 can be provided with a variety of options including, for example: mounting of a modified outlet section 203 for example configured such that outlet arrangement 211 is a tube that points in an opposite direction from that shown in FIG. 6; and, replacement of inlet section 202 with an alternate inlet section modified, for example, to receive air flow from an alternate direction and/or to have a different inlet configuration. Examples of these possibilities are discussed briefly herein below and are shown in various drawings.

In a typical arrangement, once the modular housing assembly 201 is created, the inlet section 202 and outlet section 203 would not be removed from the base 214. Thus, typically these components will typically be provided with an interference fit or be sonically welded or otherwise secured together.

The access cover 206 is configured to removable from a remainder of housing 201, for service access to an interior of the housing 201. In the example shown, the access cover 206 is secured in place by over center latches 216. Such latches 216 would typically be manufactured from metal wire and then would be mounted on latch mounts 217 molded into the access cover 206.

Still referring to FIG. 6, it is noted that for the particular air cleaner 200 depicted, inlet 210 is provided with a flexible bellows 220. The bellows 220 is an option, and is configured to be engaged by a hood of a vehicle, such as a truck, being closed over the air cleaner 200, such that an inlet duct arrangement built into the hood engages the bellows 220 for directing air to inlet 210. An example is shown schematically in FIG. 27, discussed below.

Figure 27:
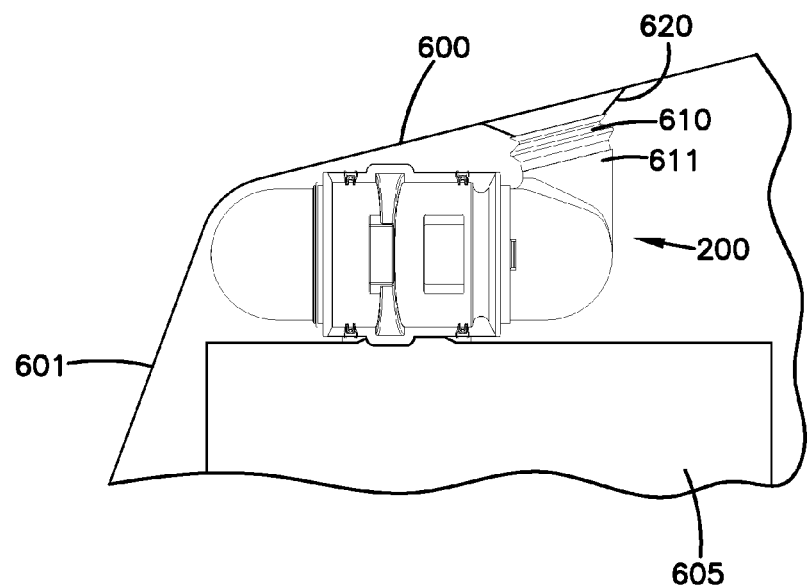
FIG. 27 is a schematic view of an air cleaner according to FIG. 7 depicted within an engine compartment of a vehicle.

The air cleaner 200 depicted in FIGS. 6 and 27, is depicted in an orientation it would typically have when installed, typically on top of an engine block and under the hood of a truck. That is, although alternatives are possible, in many uses, cover 206 would be removable laterally from a side of housing 201, instead of being lifted upwardly when removed.

Figure 7:
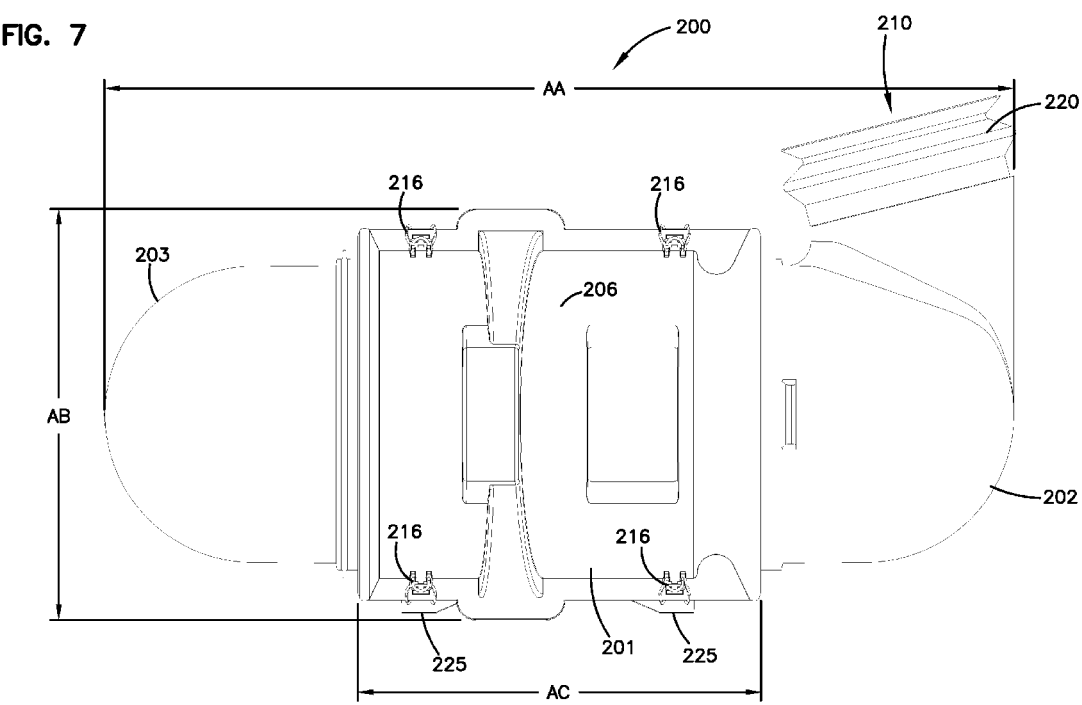
FIG. 7 is a side elevational view of the air cleaner depicted in FIG. 6.

Attention is now directed to FIG. 7. In FIG. 7 air cleaner 200 is depicted in a side elevational view; the view being toward access cover 206. It is noted that in FIG. 7 the outlet section 203 is depicted mounted rotated 180° relative to FIG. 6, such that the outlet arrangement 211 (not viewable in FIG. 7) points away from the viewer. This is indicative of certain options provided by the modular construction, as suggested above.

Referring still to FIG. 7, at 225 mounting legs or pads are provided, for securing the air cleaner 200 in position, or within equipment such as a vehicle. It is noted that mounting pads can be provided at various locations on the housing 201, to allow for alternate orientations of the mounting of the air cleaner 200. The mounting pads 225 will typically be positioned on base 214 (FIG. 6) of central section 205, for convenience and modular assembly.

For the example shown the mounting pads 225 are directed at an angle of about 90° from a direction of removal of cover 206, although alternatives are possible. This example, then, is consistent with a depicted orientation in which the cover 206 is removed laterally from the air cleaner housing 201, as opposed to being lifted directly upwardly, during servicing. Alternative orientations of mounting can be used with principles described herein, however.

Air cleaners that are in accord with the descriptions herein can be manufactured in a variety of sizes, for use with a variety of equipment. Typically the air cleaners will be used with mobile equipment such as trucks, and will be installed under a hood arrangement of the trucks. In FIG. 7 some example dimensions are indicated, for an example of such application. Of course variations from these dimensions can be used for alternate applications. The example dimensions of FIG. 7 are as follows: AA=744.3 mm; AB=336.8 mm; AC=330.1 mm.

Figure 8:
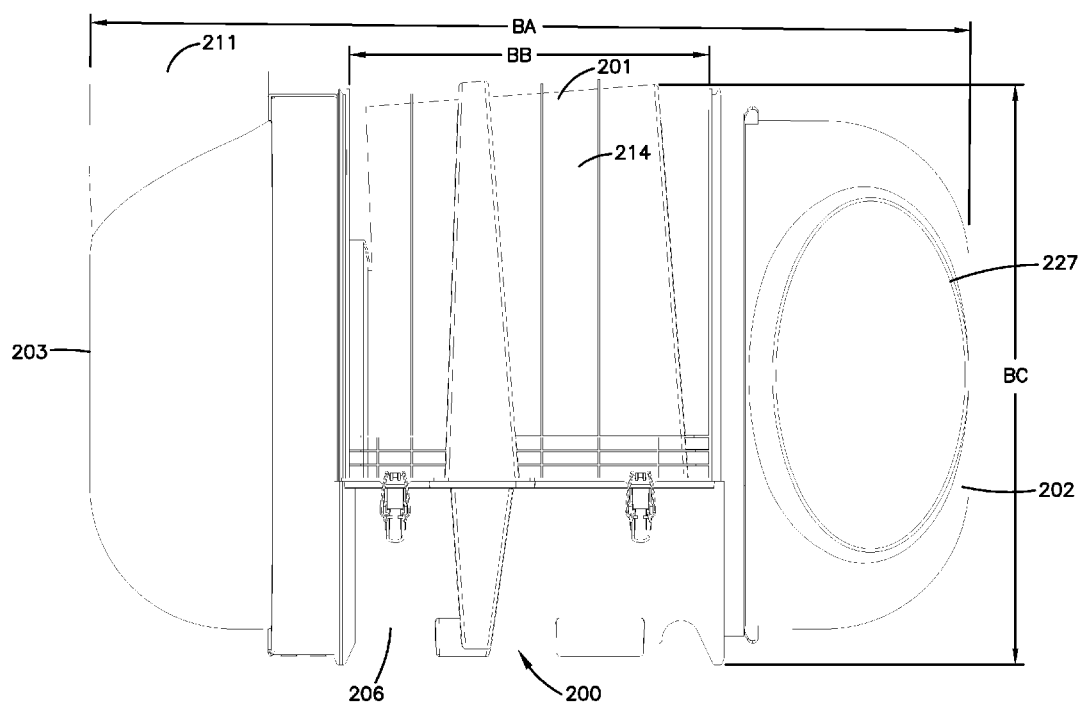
FIG. 8 is a top plan view of the air cleaner depicted in FIG. 6, with a modified inlet aperture and outlet aperture arrangement.

In FIG. 8 a top plan view of the air cleaner 200 is depicted. It is noted that in FIG. 8 the outlet section 203 is consistent with the outlet section of FIG. 7, and 180° reversed from the outlet section as depicted in FIG. 6. It is also noted that in FIG. 8 an alternate inlet section 202, with inlet arrangement 227 is depicted. This again demonstrates the convenience of the modular construction. It is noted that some different, example, dimensions are provided in the example of FIG. 8, as follows: BA=744.9 mm; BB=304.6 mm; BC=491.4 mm.

Figure 9:
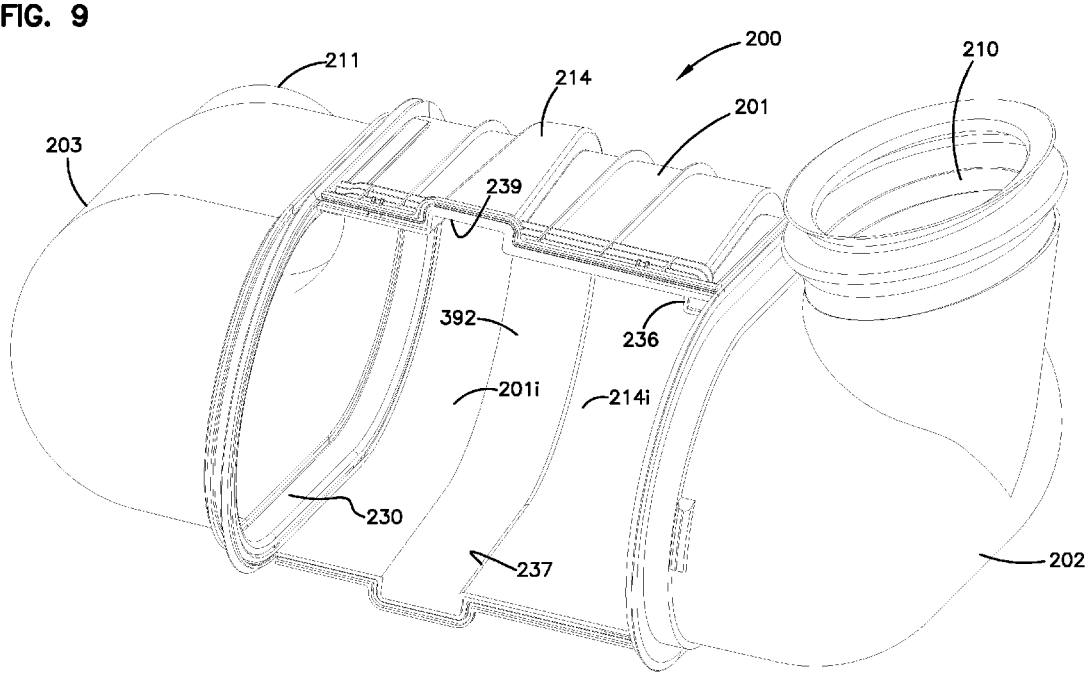
FIG. 9 is a perspective view of the air cleaner of FIG. 6, with a modified air outlet arrangement and with an access cover removed for viewing an interior of a housing thereof.

In FIG. 9 air cleaner 200 is depicted with: access cover 206 removed; and, without any installed filter cartridges. Thus interior 201i of housing 201 is viewable.

As will be understood from discussion with respect to the following figures, the air cleaner housing 201 is configured specifically to accept more than one size of primary filter cartridge, securely, as alternatives. That is, for example, the air cleaner housing 201 can be used with a first primary filter cartridge of a first axial length, or can alternatively be used with a second primary filter cartridge of a second, different, axial length. Examples of this are discussed below in connection with other figures. Configurations that allow for this, provide for a wide variety of options in the use of the air cleaner 200. In particular the same air cleaner 200 can be used with a variety of different specific vehicles, depending on the vehicle engine size and air cleaner demands, by modifying the installed filter cartridge without modifying the air cleaner housing itself. Also the same vehicle can be provided with different primary filter cartridge configurations, depending on the environment of use (for example: city; over-the-highway; and, off-road).

Herein the term "axial length" when used in connection with a primary filter cartridge, is meant to refer to a direction of extension generally between, or generally parallel with, a direction between inlet and outlet flow faces. A total overall axial filter cartridge, of course, would be measured including axial projection of any structures positioned on the media pack projecting axially outwardly therefrom. The total axial length of the media pack, would typically only refer to a maximum distance between the inlet flow face and the opposite outlet flow face.

Referring to FIG. 9, although alternatives are possible, the particular air cleaner 200 depicted, is configured for utilization with various alternative primary filter cartridges that each have a housing seal member that seals in place using an outwardly directed radial seal. This type of seal is discussed in greater detail below. Referring to FIG. 9, secure, sealing, engagement of a filter cartridge in the housing 201 is necessary to proper primary filter cartridge operation, to ensure that unfiltered air does not bypass the primary filter cartridge in moving from the inlet 210 to the outlet 211. The air cleaner housing 201 of FIG. 9, is provided with a housing seal surface for engagement by the filter cartridge at 230. That is, ring or track 230 comprises a continuous housing seal surface for a primary filter cartridge carrying a radial housing seal thereon, as described below.

In the previous paragraph reference was made to the housing seal member sealing in place using an "outwardly directed radial seal." The term "radial" in this context, is generally meant to refer to a direction generally perpendicular to an axial direction of extension of a media pack or filter cartridge. The term "outwardly" in this context, is meant to refer to a direction radially outwardly from a center axis of the media pack. These terms are discussed further below, in connection with drawings that show the primary filter cartridges.

It is noted that interior 214i of base 214 is configured with multiple (in this instance two) biasing tracks therein, to accommodate two different sized elements. A first biasing track is indicated generally at 236 and a second at 237. Operation and use of these biasing tracks will be understood from further discussion below. In general, however, it should be noted that the first biasing track 236 is positioned a different distance from inlet section 202 and outlet section 203, that is the second biasing track 237. That is, the two biasing tracks 236, 237 are spaced, axially, within the air cleaner housing 201, with biasing track 237 closer to the outlet section 203, and biasing track 236 positioned closer to the inlet section 202. Typically air cleaner housings according to the present disclosure will include at least two primary filter cartridge biasing tracks, although more than two are possible. Herein first and second biasing tracks will be discussed, and features thereof, without regard to whether they are the only two biasing tracks on only the first and second of more than two biasing tracks.

Still referring to FIG. 9, it is noted that the air cleaner housing 201 depicted, is generally configured for receipt of filter cartridges having exterior seal perimeter (peripheral) shapes that are generally oval (two narrowly curved ends with opposite sides) and media packs that have an exterior perimeter (peripheral) shape that is generally oval (again two narrowly curved ends with opposite sides). A typical oval arrangement would be a perimeter shape referred to herein as racetrack, in which the perimeter definition of both the seal and the media pack is to have opposite curved ends with opposite, generally parallel, sides extending therebetween. This is shown and discussed below, with example primary filter cartridges. Of course the principles described herein can be applied with alternate configurations of primary filter cartridges and/or seals, for example circular or alternate oval shapes in which not only are the two ends curved, but the opposite sides are also curved.

Figure 10:
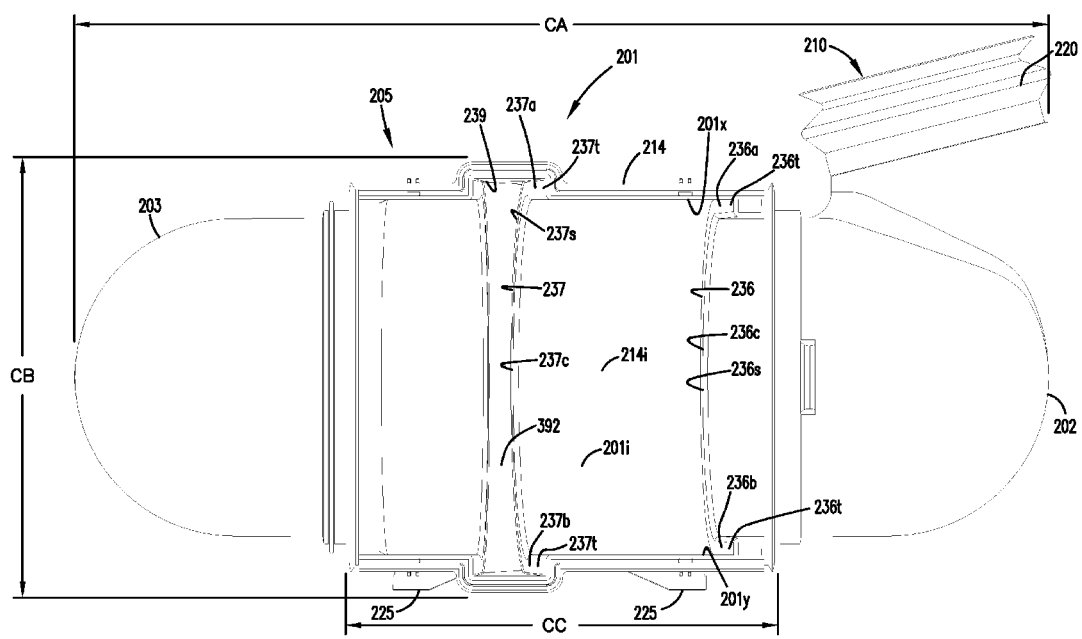
FIG. 10 is a side elevational view of the arrangement of FIG. 9.

In FIG. 10 a side elevational view of the air cleaner 200, FIG. 9, is viewed. Again the air cleaner housing 201 is viewed with the access cover 206 removed. Referring to FIG. 10, one can see that the first biasing track 236 is generally u-shaped track having opposite sides 236a, 236b, (adjacent opposite housing sides 201x and 201y respectively) and a rounded center 236c, positioned between the sides 236a, 236b. A similar track is discussed in PCT Publication WO 05/107924, published Nov. 17, 2005, incorporated herein by reference.

Biasing track 236 generally finds a u-shaped slide surface 236s which is oriented directed axially, generally toward outlet section 203 and away from outlet section 202. Surface 236s, as discussed below, is generally in a plane not quite perpendicular to a direction of extension between sections 202, 203, but rather tilted slightly with respect to a plane perpendicular to a flow direction between inlet section 202 and outlet section 203 such that center 236c is slightly closer to outlet section 203, than are side tips 236t of each of the side sections 236a, 236b.

The second biasing track 237 is also viewable having generally u-shape with opposite sides 237a, 237b, and rounded center 237c. Again, it is noted that biasing track 237 is positioned axially closer to outlet section 203 than is by track 236. Alternately stated, biasing track 236 is positioned closer to inlet section 202 than is biasing track 237.

The second biasing track 237 generally defines a track surface 237s oriented directed axially toward outlet section 203 and away from outlet section 202. Surface 237s typically is planar, and is typically oriented in a plane not quite perpendicular to a flow direction between sections 202 and 203, but rather slanted slightly therefrom, typically at a different declination angle than surface 236s, as discussed below. For surface 237s, tips 237t, then, are generally oriented closer to section 202, than is the surface 237s in center 237c.

Typically, the biasing tracks 236, 237 are configured with selected, different, dimensions. For the example shown, one dimensional difference is the width between the opposite sides of the u-shape. In particular for first biasing track 236, sides 236a and 236b (and tips 236t) are spaced closer together, than the sides 237a, 237b (and tips 237t) for the second biasing track 237. Such a difference in dimension can be utilized to advantage, as discussed further below.

Herein, in some instances a comparison will be made between the direct distance between tips 236t and the direct distance between tips 237t, with a comparison being that the distance between tips 237t is greater than the distance between 236t. When the term "direct distance" is used in connection with this comparison, the intent is to refer to the shortest distance between the tips characterized, not the distance that follows the u-shape of the corresponding biasing track.

Referring to FIG. 10, for the example shown the larger dimension for biasing track 237, in width between sides 237a, 237b, is accommodated by providing an outwardly directed u-shaped trough or projection segment 239, in which surface 237s forms one of the axial sides, i.e., a side closest to inlet section 202 and facing outlet section 203.

As above noted, each of the u-shaped biasing tracks 236, 237 generally extends inwardly of section 214 at an acute angle tapering toward outlet section 203 from inlet section 202. Somewhat different angles can be used, to advantage, for these two tracks. Typically each of the tracks will extend at a declination angle of at least 0.5°, usually not more than 15°, typically within the range of 2° to 10°. The term "declination angle" as used in this context, is meant to refer to an acute angle between a plane defining a respective one of the tracks 236, 237 and a plane perpendicular to the general direction of air flow through air cleaner 200 from inlet 202 to outlet 203. Typically when a difference in the declination angle is used for the two tracks 236, 237, it is at least 0.5°.

Dimensions provided in FIG. 10, for the example shown, are as follows: CA=744.3 mm; CB=336.8 mm; and, CC=330.1 mm.

As indicated previously, air cleaner housing 201 is configured to allow for alternate receipt for at least two different sizes (lengths) of primary filter cartridges therein. This is facilitated by the two biasing tracks 236, 237. As indicated, the air cleaner 200 could be provided with a biasing track arrangement that allows for more than two alternate possibilities for cartridge lengths using the same principles discussed.

Although alternatives are possible, typically the air cleaner housing 201 would be configured to alternately accept different cartridges which differ in overall axial length by at least 40 mm, typically at least 60 mm, often at least 80 mm, and usually 100-200 mm, although alternatives are possible. The distance between the locations of the biasing tracks 236, 237 is not necessarily the same as the difference of the lengths of the cartridges, since in one example shown the cartridge engages a biasing track at its end, whereas the second cartridge engages a biasing track at a location spaced from an end of the media pack. However, in general, a difference in axial spacing between the biasing tracks will be at least 40 mm, typically at least 60 mm, and usually at least 80 mm. Often the distance is also within the range of 100-200 mm.

B. An Example First Primary Filter Cartridge and Installation.

Figure 11:
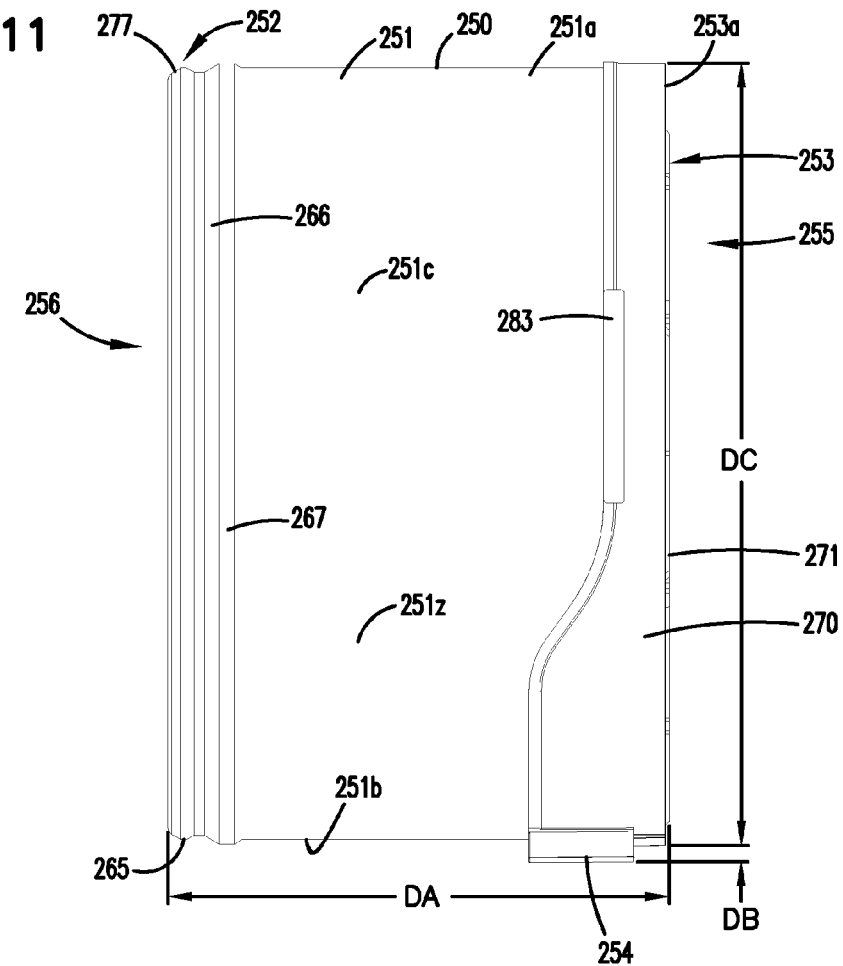
FIG. 11 is a top plan view of a first, relatively long, filter cartridge configured for installation in the air cleaner arrangements of FIGS. 1-10.
Figure 12:
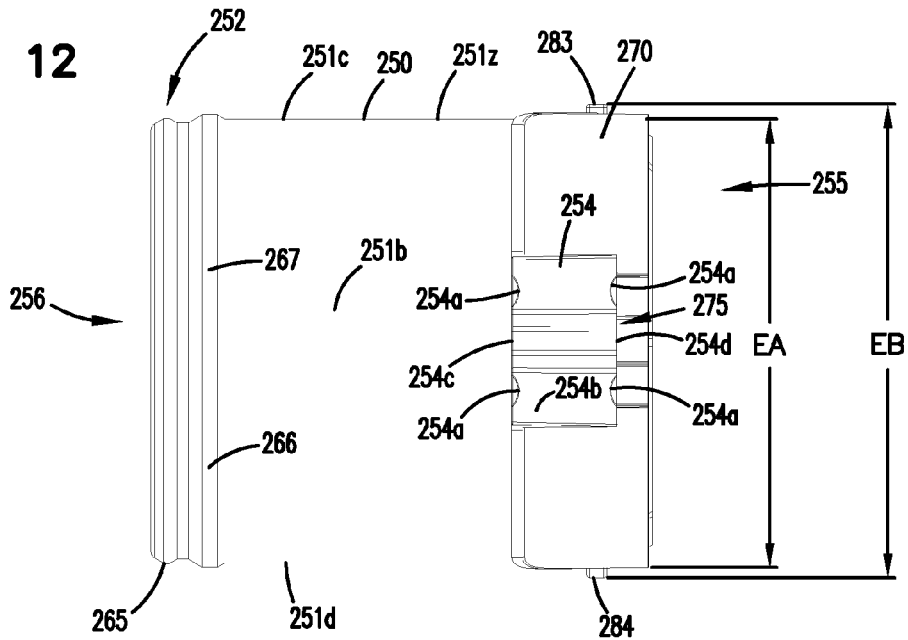
FIG. 12 is a side elevational view of the filter cartridge of FIG. 11.

In FIGS. 11 and 12, a first primary filter cartridge 250 is depicted for installation in air cleaner 200. Specifically, primary filter cartridge 250 is configured to be installed in a position extending between a location contacting (or if not contacting adjacent) first biasing track 236 (FIGS. 9 and 10) with sealing at housing seal surface 230. Thus, for the example shown in FIGS. 9 and 10 the first filter cartridge 250 is sized as a maximum (axial) length (or nearby maximum length) cartridge that can be fit within interior 214a of housing base 214.

In FIG. 11 a top plan view of the filter cartridge 250 is depicted. The cartridge 250 is oriented as it would be during installation in the housing 201, with the observer looking down the filter cartridge 250.

Referring to FIG. 11, the filter cartridge 200 includes the following general features: media pack 251; seal arrangement 252; guide arrangement 253; and, handle arrangement 254.

The media pack 251 generally comprises z-filter media in accord with the descriptions provided above. As explained above, z-filter media can be provided in any of two forms: as a coiled arrangement of a single facer comprising a fluted (corrugated) media sheet secured to a facing media sheet; or, as a stack of strips of single facer each comprising a fluted (corrugated) media sheet secured to a facing media sheet. Either type of arrangement can be provided with the general techniques described herein. However, the assemblies depicted are specifically configured for use with coiled arrangements, and variations in shape and other detail would typically be used when a stacked media pack arrangement is to be used. Thus, the example media pack 251 depicted comprises a coiled z-filter media arrangement 251z, comprising a fluted (corrugated) media sheet secured to a facing media sheet, coiled with the facing sheet directed outwardly.

The media pack 251 generally includes (defines) an inlet face 255 and an outlet face 256. The outlet face 256 is generally located at an opposite (axial) end of the media pack 250 from the inlet face 255.

The media pack 251 is generally closed to flow of air therethrough, between inlet face 255 and outlet face 256, unless the air passes through a media sheet (fluted or facing) with filtering.

The particular media pack 251 depicted has a generally obround perimeter (peripheral) shape, particularly an oval perimeter shape comprising two opposite curved ends 251a, 251b with sides 251c and 251d extending therebetween. The particular shape is racetrack, with sides 251c and 251d being approximately straight and parallel to one another.

The seal arrangement 252 is depicted mounted at an end of the media pack 251 defining outlet face 256. However in some embodiments, alternate arrangements are possible. The seal arrangement 252 comprises housing seal member 265 oriented, positioned and sized to form a housing seal with housing seal surface 230, FIG. 9, when cartridge 250 is operably installed within an interior 201a of housing 201. The particular housing seal arrangement 252 depicted is positioned and configured for housing seal member 265 to form an outwardly directed radial seal, compressed upon engagement with region 230. A variety of types of housing seal arrangements 252 are possible, selected ones of which are described in U.S. Pat. Nos. 6,783,565, 6,190,432, 6,350,291, 6,610,117, U.S. Publication US 2005/0166561, published Aug. 4, 2005, PCI Publication WO 05/63361 and U.S. Provisional Application 60/735,650, filed Nov. 9, 2005, incorporated herein by reference. Some examples of such seal arrangements are discussed briefly below. Typically, the housing seal region 265 comprises a compressible polymeric material, for example foamed polyurethane positioned around rigid structural member, against which the polymeric material in region 265 can compress, when inserted into region 230, FIG. 9.

Typically, the seal region 265 is positioned at a location axially beyond end face 256 of the media pack 251, in a direction opposite face 255. That is, the seal region 265, which sealingly engages housing section 230, does not extend around the media pack 251, but rather is mounted on a frame structure or extension projecting axially outwardly from the media pack 251, away from the media pack 251 in a direction opposite surface 255. For the example shown, the seal region 265 is part of an overmold 266 which has a second, but integral, portion 267 that does engage and surround the media pack 251.

The principles described herein can be utilized with alternate seal arrangements, including ones that extend around a media pack. However for the particular housing 201 depicted, and primary filter cartridges 250 described herein, a seal arrangement 252 described, in which the housing seal member 265 includes a radially outwardly directed seal region positioned at a location axially outwardly from the media pack 251, is typical.

Still referring to FIG. 11, for the example shown, filter cartridge 250 includes, mounted on (and in the example shown surrounding) the media pack 251 at a region adjacent end face 255, a preform support 270. The term "preform" as used herein in this and related contexts, refers to a structural member formed and then later attached to the media pack 251, during assembly of the cartridge 250. The preform support 270 includes, among other things, guide arrangement 253 and handle arrangement 254. In addition, the particular preform support 270 depicted, includes an inlet end grid 271 which extends across face 255.

Typically, the preform support 270 would be molded from an appropriately robust plastic material with the features of the inlet grid 271, guide arrangement 253 and handle arrangement 254, molded integrally as part thereof.

For the example shown, the guide arrangement 253 comprises an edge 253a of the preform support 270 adjacent (typically slightly axially outwardly from) end face 255. The edge 253 (guide arrangement 253) engages surface 236s of the first biasing track 236, slidably, during installation of the cartridge 250 into housing interior 201a. More specifically, during installation of cartridge 251, edge 253a of the guide arrangement 253 is positioned in axial overlap in contact with surface 236s, to slide therealong during installation.

Referring now to FIG. 12, preform support 270 includes handle member 254 thereon, positioned on a platform region 275 of support 270. The example handle member 254 depicted, is positioned in overlap with one of the curved ends 251b of the media pack 251.

Handle member 254 is sized and shaped to be easily grasped by an installer and service provider. It is also sized with a perimeter (in this instance generally rectangular with finger scallops) to engage a feature in the access cover 206, FIG. 6, discussed below. The particular perimeter definition of handle member 254 for the example shown, FIG. 12, includes finger scallops or depressions 254a on opposite sides of handle member 254, directed toward faces 255, 256 respectively. For the example shown, a service provider's fingers can be positioned under surface regions 254b under each of the opposite sides 254c, facing surface 256, and 254d, facing surface 255. Alternate arrangements are possible.

During installation, the handle member 254 is typically grasped, and the cartridge 250 is inserted into base interior 214i with: end 277, FIG. 11, of the seal region 265, and end 251a of the media pack 251 first inserted; and, with the guide arrangement 253 slidably positioned against (and in engagement with) surface 236s of the first biasing track 236, FIG. 10. With continued insertion, the cartridge 250 will slide along surface 236s of the biasing track 236, pushing the seal region 265 further into engagement with housing seal surface 230. Initial engagement will involve end 277 overlapping housing seal surface 230. Final securement of the housing seal occurs by the service provider tipping the cartridge 250 in the direction of arrow 280, FIGS. 13 and 14, to position the cartridge 230 in sealing orientation. This will ensure that the housing seal region 265 is fully engaged with the housing seal surface 230, in a radial sealing manner. In FIG. 14, a view analogous to FIG. 13 is shown, from a top view, and with the inlet section 202 of the housing modified from the inlet section 202 of FIG. 13.

Figure 13:
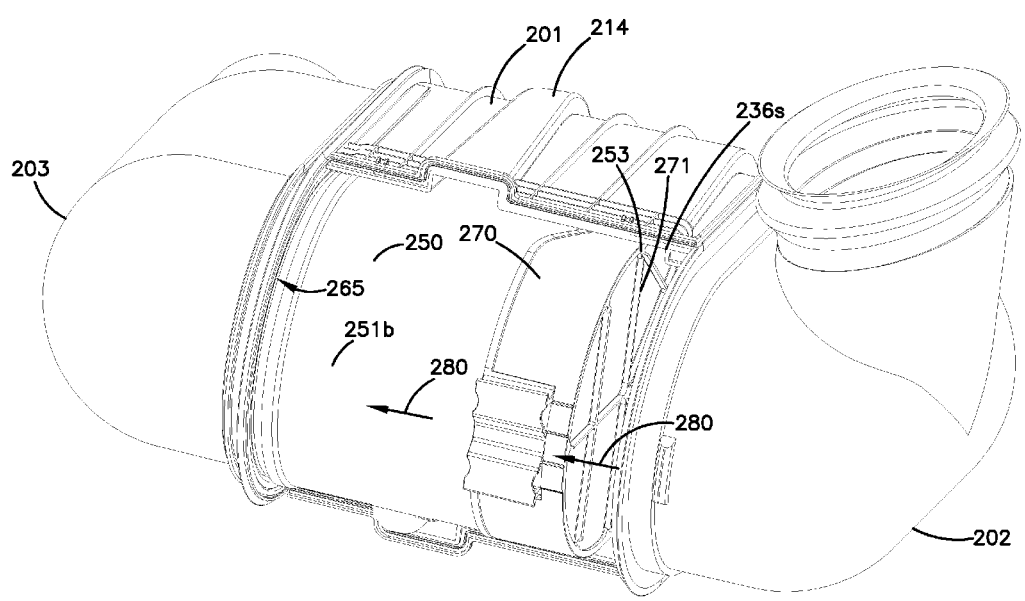
FIG. 13 is a side perspective view of the filter cartridge of FIGS. 11 and 12 installed in an air cleaner housing generally according to FIGS. 6-10 prior to positioning of an access cover on the air cleaner housing.
Figure 14:
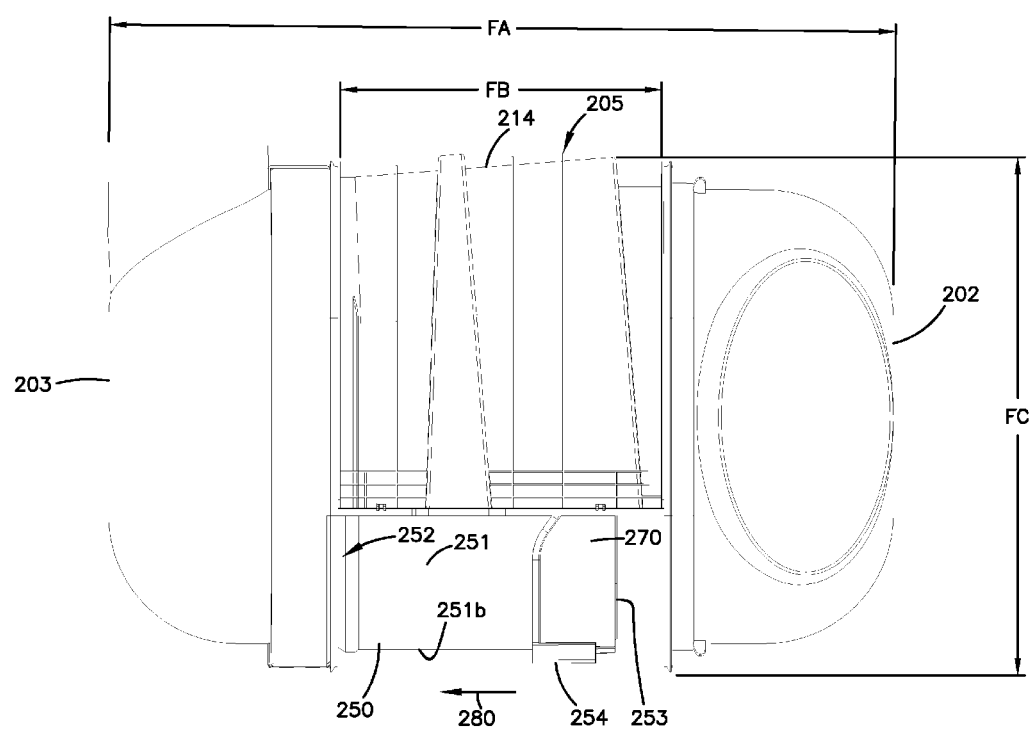
FIG. 14 is a top plan view generally according to FIG. 13, with a modified inlet cover.

It is noted that in FIGS. 13 and 14, the cartridge 250 is already maximally tipped in the direction of arrows 280, into full sealing.

Referring to FIGS. 9-14, it will be understood that engagement between the preform support 270 (in particular edge 253a of guide arrangement 253) and the biasing track 236 occurs as a sliding engagement with guide arrangement 253 contacting axial slide surface 236s of track 236. The term "axial" in this context, is meant to refer to the fact that surface 236s which faces axially toward outlet section 203 from inlet section 202. Once the final seal engagement occurs, FIG. 13, guide arrangement 253 will be tipped out of axial or sliding contact with all or a portion of surface 236s. Whether or not contact is retained (after tipping into sealing engagement) between guide arrangement 253 and a portion of center 236c, FIG. 9, is dictated by the various dimensions of the components involved. However, the tipping described, will typically move the guide arrangement 253 out of direct contact with sides 237a, 237b.

Figure 15:
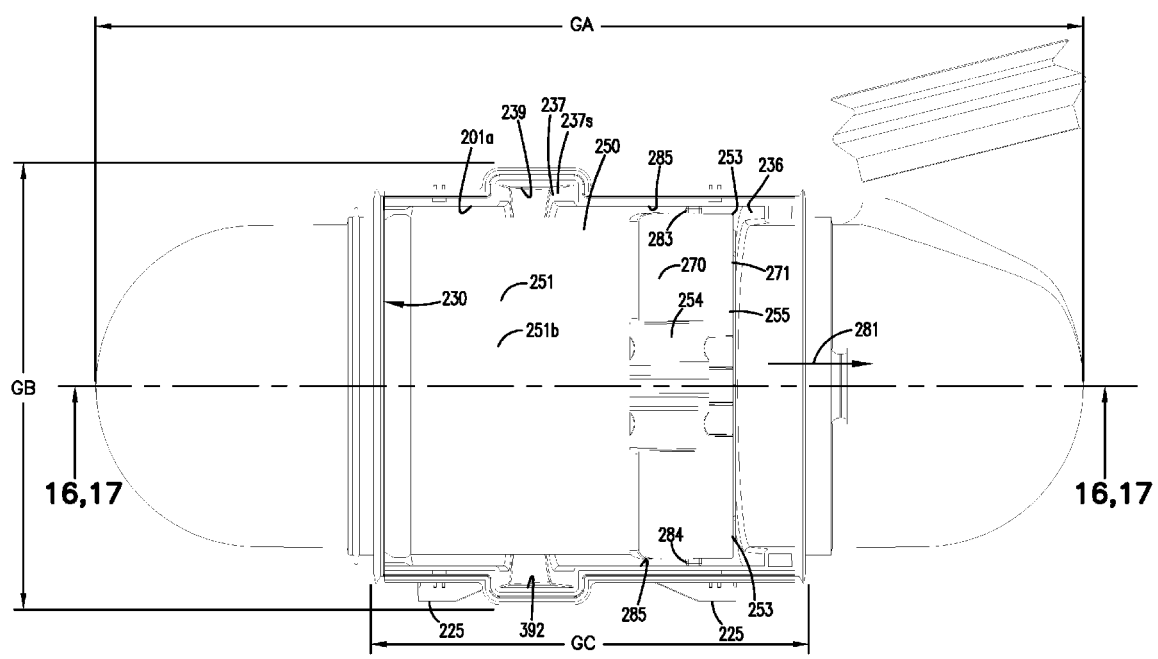
FIG. 15 is a side elevational view of the partial assembly of FIGS. 13 and 14.

In FIG. 15, a side elevational view showing primary filter cartridge 250 installed in housing 201 is also shown. It can be seen that the cartridge 250 substantially fills the space between the first biasing track 236 and the housing seal surface 230. However, it is noted, again, that the cartridge 250 is tipped slightly away from complete (and in some possible instances all) contact with the first biasing track 236.

Still referring to FIG. 15, it is noted that the second biasing track 237 is not engaged by the cartridge 250. Rather the biasing track 237 is depicted unused, within projection 239, surrounding cartridge 250. As a result, it is observed that media pack 251 extends across biasing track 237, without engaging the biasing track 237; and the filter cartridge 250 does not engage slide surface 237s of biasing track 237.

Figure 16:
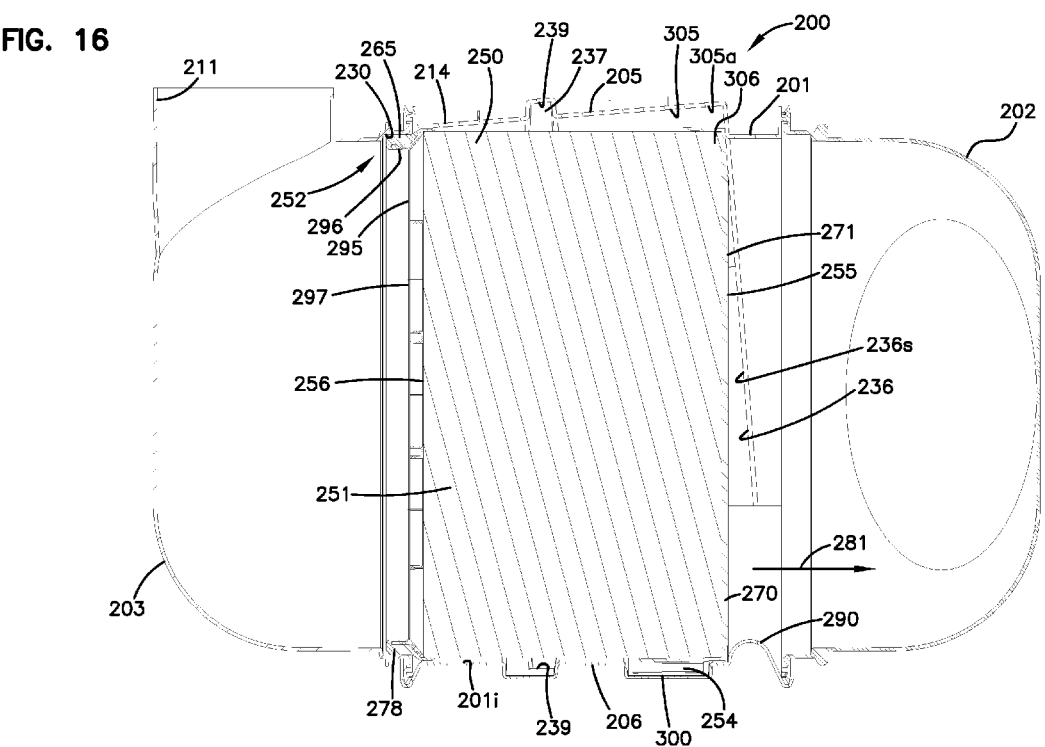
FIG. 16 is a cross-sectional view of the assembly of FIG. 15, taken with the access cover replaced and generally along line 16-16, FIG. 15.

When the access cover, discussed below in connection with FIG. 16, is installed, provision is made to prevent the cartridge 250 from tipping in the direction of arrow 281, FIG. 15, out of the sealed arrangement shown in FIGS. 13-15.

Example dimensions provided in FIGS. 11-15 are as follows: DA=286.6 mm; DB=9.4 mm; DC=447.7 mm; EA=256.7 mm; EB=271.2 mm; FA=744.9 mm; FB=304.6 mm; FC=491.4 mm; GA=744.3 mm; GB=336.8 mm; and, GC=330.1 mm.

Figure 15A:
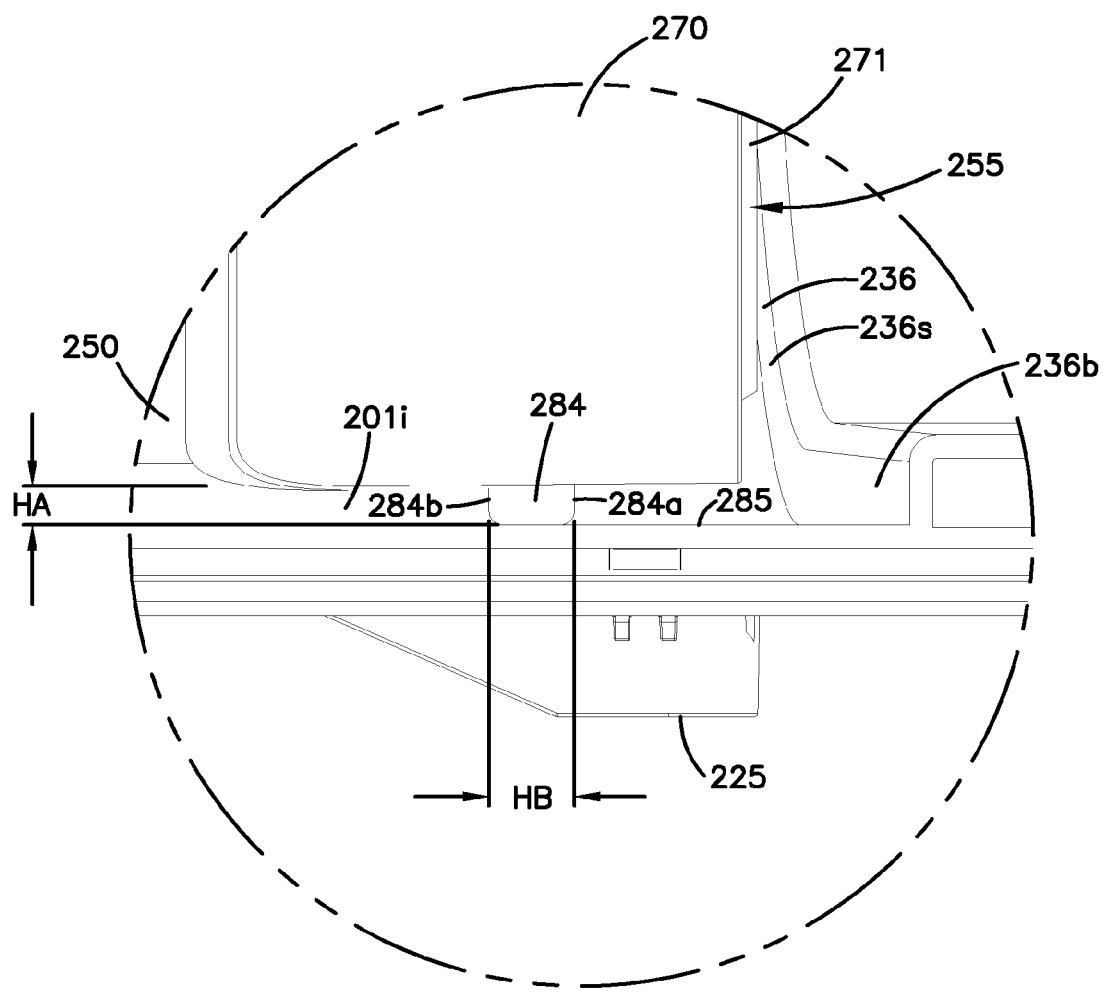
FIG. 15A is an enlarged fragmentary view of a portion of FIG. 15.

FIG. 15A is an enlarged fragmentary view of a portion of FIG. 15, showing a portion of the cartridge 250 positioned relative to the first biasing track 236, after installation. In FIG. 15A, example dimensions provided are as follows: HA=5.5 mm; HB=12.0 mm.

Referring to FIG. 12, the preform 270 includes opposite spacers or spacer projections 283, 284 centrally positioned along opposite sides 251d, 251c, respectively of the primary filter cartridge 250. Referring to FIG. 11, in which spacer projection 283 is depicted, each spacer projection 283, 284 typically extends generally parallel to inlet face 255 and projects radially outwardly from an adjacent portion of preform 270. The term "projects radially outwardly" in this context, refers to a projection away from the media pack 251 and preform 270, in a direction radially outwardly from a center of the media pack 250, as opposed to directed axially as discussed above. A typical amount of radial outward projection is at least 2 mm, typically 3 to 15 mm, inclusive, usually 4-12 mm inclusive, relative to adjacent portions of preform support 270 although alternatives are possible. Referring to FIGS. 15 and 15a, the spacers 283, 284 facilitate stable positioning of the cartridge 250 within the housing interior 201a by filling space between preform 270 and an interior wall region 285, of housing interior 201i. This will facilitate installation and stable positioning of the cartridge 250 once installed.

Referring to FIG. 11, each spacer 283, 284 typically extends along a respective side (251c, 251d) of side 251, a distance of at least 40 mm, usually at least 60 mm, typically not more than 150 mm and often within the range of 60 mm to 100 mm. In more general terms, for an oval media pack 251 as depicted, the spacer projections 283, 284 typically extend a distance corresponding to at least 5%, and typically within the range of 5% to 40% of the maximum width of the media pack 251 between outer surfaces curved ends 251a, 251b. Herein, a distance of extension of the side spacer projections 283, 284 between opposite ends, will sometimes be referred to as the "length of extension." Typically, each one of the spacer projections 283, 284 is continuous along its length of extension. However, in some instances gaps can be provided.

In FIG. 15A, dimension between opposite axial sides 284a, 284b of the projection 284, will be referred to as the axial thickness of the projection 284. Typically each of the spacer projections 283, 284 has an axial thickness of at least 6 mm, and usually within the range of 6 mm-15 mm, inclusive, although alternatives are possible.

It is noted that the spacers 284, 285 are spaced from end face 255 of the media pack. This will be typical for arrangements as described herein. The amount of this spacing can be varied, depending on the particular housing arrangement, but typically will be at least 10 mm, usually at least 15 mm. For the particular example shown in FIGS. 15 and 15A, projections 283, 284 are spaced from end face 255 by a distance of at least 18 mm (typically 15-25 mm), although alternatives are possible.

Attention is now directed to FIG. 16 in which a cross-sectional view is taken of the assembly 200, generally along line 16-16, FIG. 15. It is noted that for the orientation of FIG. 16, the view is looking up into the upper half of the assembly 200 of FIG. 15, but the assembly has been inverted for the typical viewer to be looking down onto the picture.

In FIG. 16 the housing 201 is shown with an inlet section 202 corresponding generally to that shown in FIG. 14, but it could be modified in accord with the discussions herein. Further in FIG. 16 the housing 200 is depicted with an outlet section 203 generally in accord with FIG. 14, but it could be modified in accord with the descriptions herein.

Cartridge 250 is shown positioned within housing interior 201a, in particular in section 205. Access cover 206 is depicted positioned in place as part of housing section 205.

Selected features of the access cover 206 relating to the installation of cartridge 250 are as follows: (a) the access cover 206 includes interiorly directed projection 290 thereon positioned to extend axially behind a portion of end 255 of the media pack 251, and also behind an axial end of preform 270. The term "behind" in this context, is meant to refer to a projection or extension to a location between the cartridge features indicated (end 255 and preform support 270) and outlet section 202. Projection 290 will prevent the cartridge 250 from tipping or backing out of sealing contact with housing seal surface 230, in the direction of arrow 281, until access cover 206 is removed. Referring to FIG. 16, end face 256, in this instance an outlet face of media pack 250 is viewable, as well as outlet end preform 295 including rigid seal support 296 positioned radially supporting housing seal arrangement 265. In addition outlet end preform 295 is shown with a grid 297 extending across face 256.

Another feature in access cover 206 is receiver 300 sized and positioned to receive therein handle arrangement 254, as a projection, in a mating manner, when service cover 206 is installed. The receiver 300 will help stabilize the cartridge 250 is proper position, and will help ensure that a proper cartridge 250 has been installed, for the air cleaner configuration desired.

Many of the housing of the filter cartridge features just described, are also characterized in PCT Publication WO 05/107924, published Nov. 17, 2005, incorporated herein by reference.

Still referring to FIG. 16, it is noted that opposite access cover 206, housing base 214 includes a receiver section 305, with a greatest depth, relative to the cartridge 250, provided adjacent face 255 as shown at 305a. The receiver section 305 facilitates dismounting the cartridge 200 as follows. The access cover 206 is removed, after disengaging the latches 216, FIG. 6. Then, by manipulating the cartridge 250, for example by pressing on handle arrangement 254, the handle 254 will tip in the direction of arrow 281 and a portion 306 of the cartridge 250 will push into receiver 305. This movement pulls edge (region) 278 of the seal arrangement 265 out of sealing contact with region 230. The cartridge 250 is now loosened, and it can be removed for example by grasping and pulling the handle 254. This type of arrangement for mounting and dismounting a filter cartridge is generally described in PCT Publication WO 05/46841, published May 26, 2005, incorporated herein by reference.

Still referring to FIG. 16, it is noted that for the air cleaner assembly 201 depicted, the housing seal surface 230 is positioned within the same modular component that forms outlet section 203. Variations from this are possible, however.

It is noted that the air cleaner 200 can be configured (typically by modification of outlet section 203), for receipt therein, and mounting therein, of a secondary or safety filter if desired. Such arrangements as those described in PCT Publication WO 05/107924, published Nov. 17, 2005, incorporated herein by reference, could be adapted for systems in accord with the principles described herein.

Figure 17:
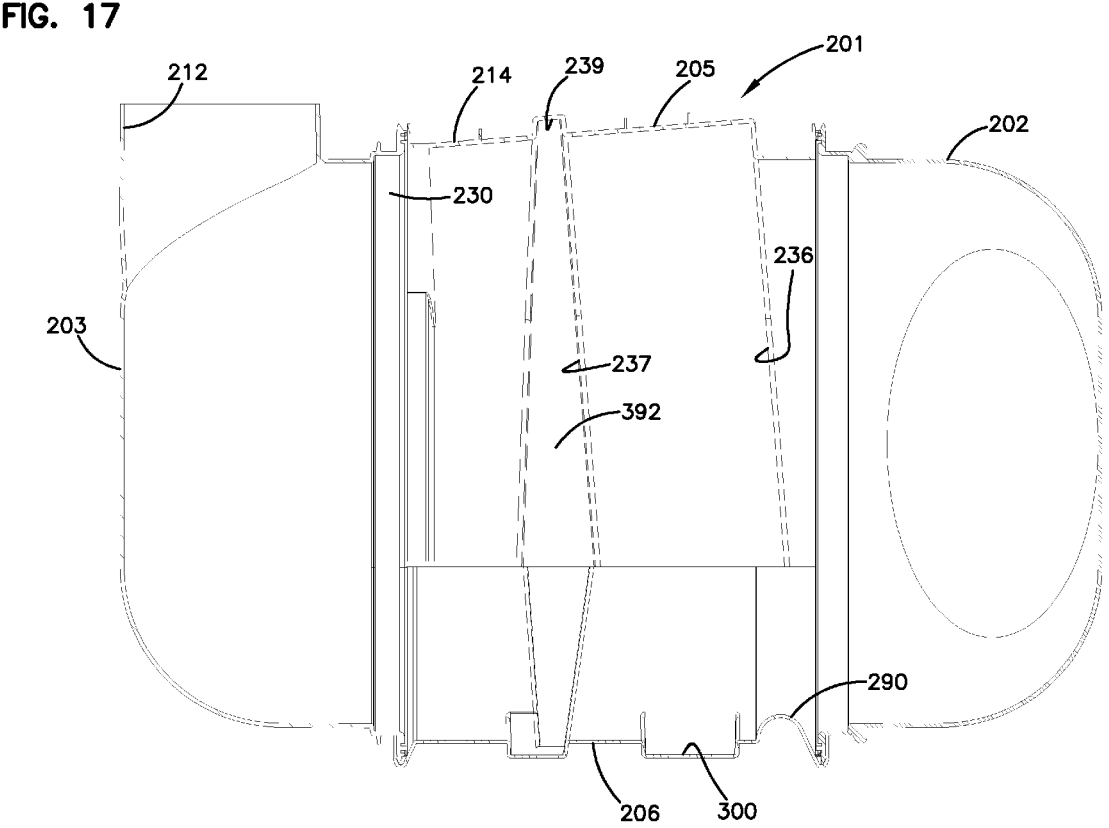
FIG. 17 is a cross-sectional view analogous to FIG. 16, and taken along line 17-17, FIG. 15, depicting the air cleaner housing with: the filter cartridge removed; the access cover in place; and a modified inlet section and outlet section.

In FIG. 17, a cross-sectional view analogous to FIG. 16 is depicted except showing the air cleaner housing 201 without cartridge 250 installed, but with access cover 206 in place.

C. Installation of a Second, Shorter, Filter Cartridge Within the Air Cleaner Housing 201 as an Alternative, FIGS. 18-24.

As discussed previously, the air cleaner assembly 200 is specifically configured as to be capable of alternately receiving, securely, as least two different sized filter cartridges therein, depending on the needs of the vehicle or vehicle operator. By "alternately receiving" in this and related context, it is meant that the air cleaner housing 201 can be configured to receive a first sized primary filter cartridge or second sized primary filter cartridge, but not the two at the same time. Description of features and installation of a second, shorter, filter cartridge is described in connection with FIGS. 18-24.

Turning first to FIGS. 18 and 19, a second filter cartridge 350 is depicted also sized and configured to be mounted with an air cleaner 200, analogously to cartridge 250, but having a smaller length dimension between flow faces and thus occupying less space of interior 201a. Referring to FIG. 18, the second filter cartridge 350 comprises a media pack 351, seal arrangement 352, guide arrangement 353 and handle arrangement 354. The media pack 351 includes an inlet face 355 and an opposite outlet face 356. The media pack 351 may be generally as previously described for media pack 251, except configured and sized for the particular example shown. The particular media pack 351 shown, comprises a coiled media pack fluted (corrugated) media sheet secured to a facing media sheet with the facing media sheet directed to the outside. The coiling is in an oval shape, having opposite curved ends 351a, 351b with opposite sides 351c and 351d extending therebetween. The particular example shown is racetrack, with opposite sides 351c and 351 being generally straight, in extension between the curved ends 351a, 351b. In FIGS. 18-19, the dimensions indicated, as an example, are as follows: IA=473.0 mm; IB=163.6 mm; JA=23.1 mm; JB=257.0 mm; JC=23.1 mm.

Although alternatives are possible, typically a length between opposite flow faces for a smaller cartridge, installed within arrangements according to the present invention, by comparison to the larger cartridge, will be such the smaller cartridge is at least 40 mm shorter in length, typically at least 60 mm shorter, often at least 80 mm shorter in length, and in many instances at least 100 mm shorter in length, for example 100 mm-200 mm shorter, inclusive. Alternatives from this, of course, are possible.

The seal arrangement 352 may be generally as described previously for seal arrangement 252, in some instances can be identical. Thus, the depicted housing seal arrangement 252 comprises housing seal member 365 and an integral portion 366; the integral portion 366 surrounding media pack 351 and the seal member 365 being positioned on a support projecting axially outwardly away from the media pack face 356, in a direction opposite face 355. The housing seal member 365 defines an outer periphery for the example shown that is of a same general shape as the outer periphery of the media pack 351, in this instance oval with two opposite curved ends and two opposite sides, the example shown being racetrack with the opposite sides being straight and parallel to one another. Further, media pack 350 comprises a preform support 370 positioned thereon including an end grid 371 extending across face 355. The preform support 370 includes many features analogous to preform support 270, but is sized and shaped differently for convenience. In particular handle arrangement 354, positioned on preform support 370, is of a smaller size (and different shape) than handle arrangement 254, for convenience.

In FIG. 19, a plan view of the filter cartridge 350 is depicted; the view point is looking toward the handle arrangement 354 as it would be oriented for installation in the housing 201, when the housing 201 is positioned generally as shown in FIG. 6. The preform support 370 includes opposite sides 374, 373, with spacers 383, 384 respectively projecting radially outwardly therefrom. The distance between sides 373, 374, is preferably greater than interior dimension of the housing 201 between regions 201x, 201y, FIG. 10, inhibiting the cartridge 350 from being installed using first biasing track 236. Typically and preferably the distance between the sides 373, 374 is sufficiently large that the cartridge 350 can only be installed if the sides 373, 374 are positioned in the trough shaped projection 239, FIG. 10. The sides 373, 374 depicted generally comprises opposite, radially outwardly directed, slide projections each of which has an axial face 374a, 373a facing generally in the direction of the inlet face 355. These are positioned to engage the slide surface 237s of biasing track 237, during installation. The slide surfaces 373a, 374a, which are positioned to engage slide surface 273s of the biasing track, are typically at least 5 mm, and usually at least 10 mm wide, in projection outwardly from an adjacent portion of preform support 370, not including the amount of projection of the side projections 383, 384. The radial slide projection comprising projections 373, 374 is typically positioned spaced from inlet face 355 toward outlet face 356 by a distance of at least 10 mm, typically 10-40 mm, often at least 15 mm, for example 15-30 mm, inclusive, although alternatives are possible.

Proper installation of the filter cartridge 350 will be understood by reference to FIGS. 20-24.

Figure 20:
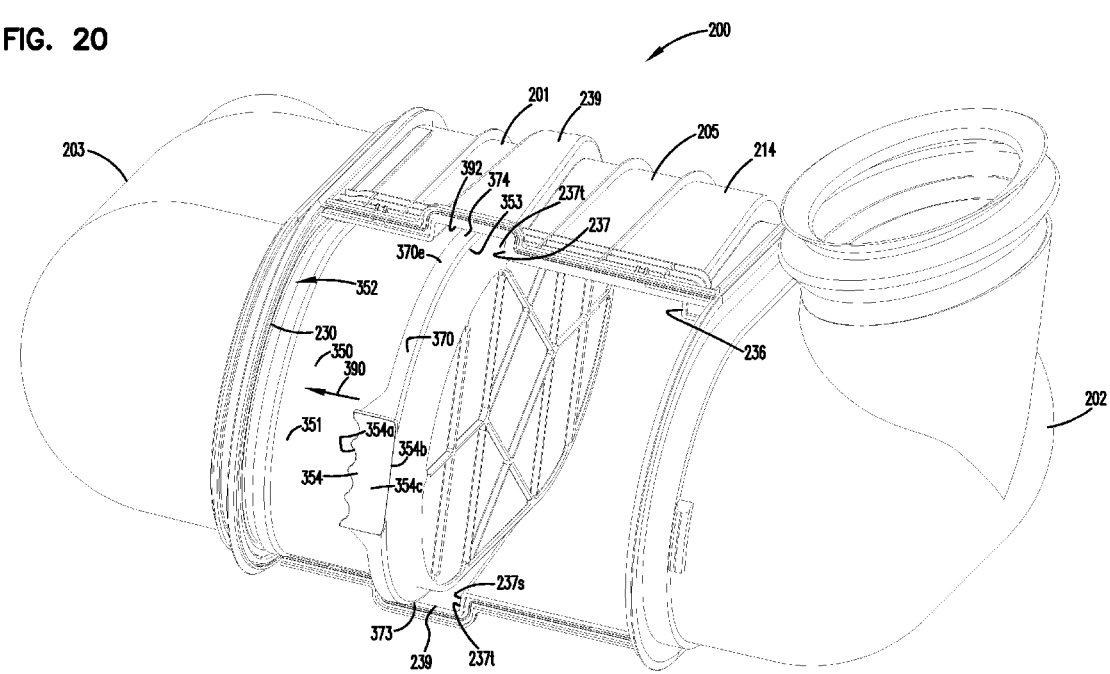
FIG. 20 is a side perspective view depicting the cartridge of FIGS. 18 and 19 installed in a housing generally in accord with FIGS. 6-10 but without an access cover on the housing.

Referring first to FIG. 20, the cartridge 350 is shown installed within housing 201, without access cover 206 in place. That is, the cartridge 350 is positioned with seal member 352 in sealing engagement with housing seal track 230. The cartridge 350 is installed by first engaging guide arrangement 353 with biasing track 237, and sliding the cartridge 350 against the track surface 237 during installation. Once sliding is completed, the cartridge 350 would then be rocked or tipped in the direction of arrow 390, to complete the sealing. (In FIG. 20, the cartridge 350 shown tipped as far in the direction of arrow 390 as it will go, during installation.) Thus, installation is analogous to cartridge 250, but using a biasing track 237. In FIG. 20, the cartridge 350 is shown installed after the tipping in the direction of arrow 390 has occurred.

Referring still to FIG. 20, it is noted that housing 201 includes a u-shaped trough 392 (in both cover 206 and base 214) positioned as an inside of projection 239 and positioned to receive edge 370e of preform 370 therein, during installation. One axial inside surface (the side 237 closest to inlet section 202 and facing outlet section 203) of the receiver 392 comprises biasing surface 237. The groove or trough 392 preferably has a greater direct dimension in width between tips 237t than the dimension directly between tips 236t of track 236. The cartridge 350 cannot be inadvertently installed utilizing track 236, since the distance between side projections 373, 374 is too great.

It is noted that groove or trough 392 is sized, to accommodate the tipping motion of the cartridge 350. That is, the groove or trough 392 has a general v-shape, so that side projection 373, 374 with projections 384, 383, respectively thereon, can tip forwardly than the groove 392.

Of course dismounting of cartridge 350 would generally involve a reverse process, with an overall operation analogous to that described for cartridge 250 above.

Figure 21:
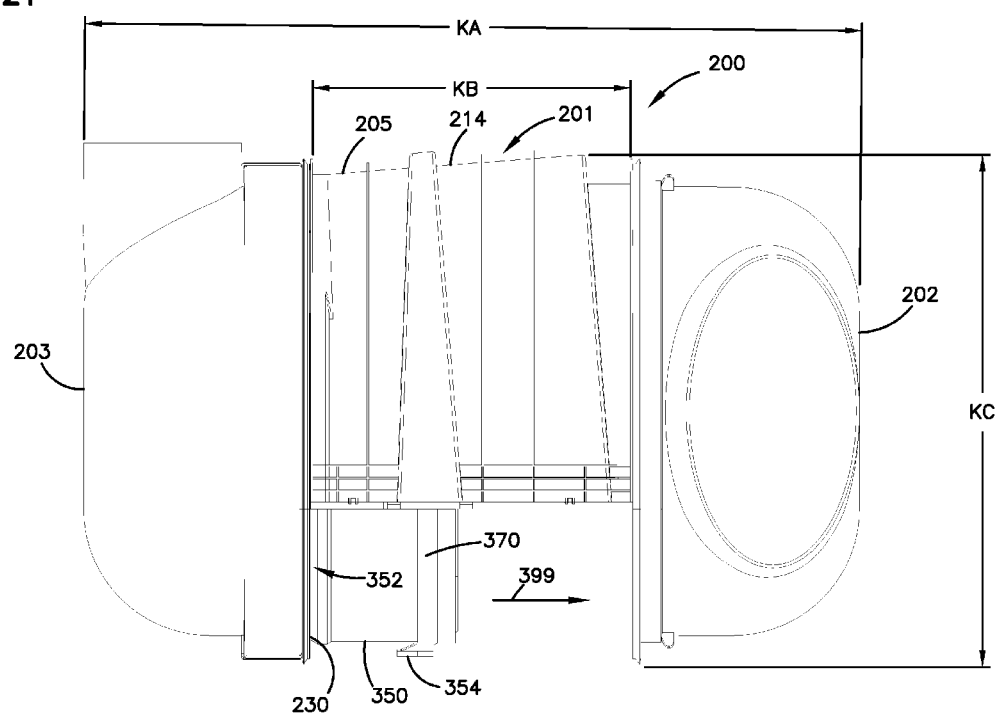
FIG. 21 is a top plan view of the assembly of FIG. 20, with a modified inlet and without an access cover in place.

In FIG. 21 a top plan view of air cleaner 200 with cartridge 350 sealingly installed therein is shown, without access cover 206 in place. It is noted that inlet section 202 for the arrangement of FIG. 21 is depicted modified from inlet section 202, FIG. 20, but analogous principles are involved. In FIG. 21, the indicated dimensions are as follows: KA=744.9 mm; KB=304.6 mm; KC=491.4 mm.

Figure 22:
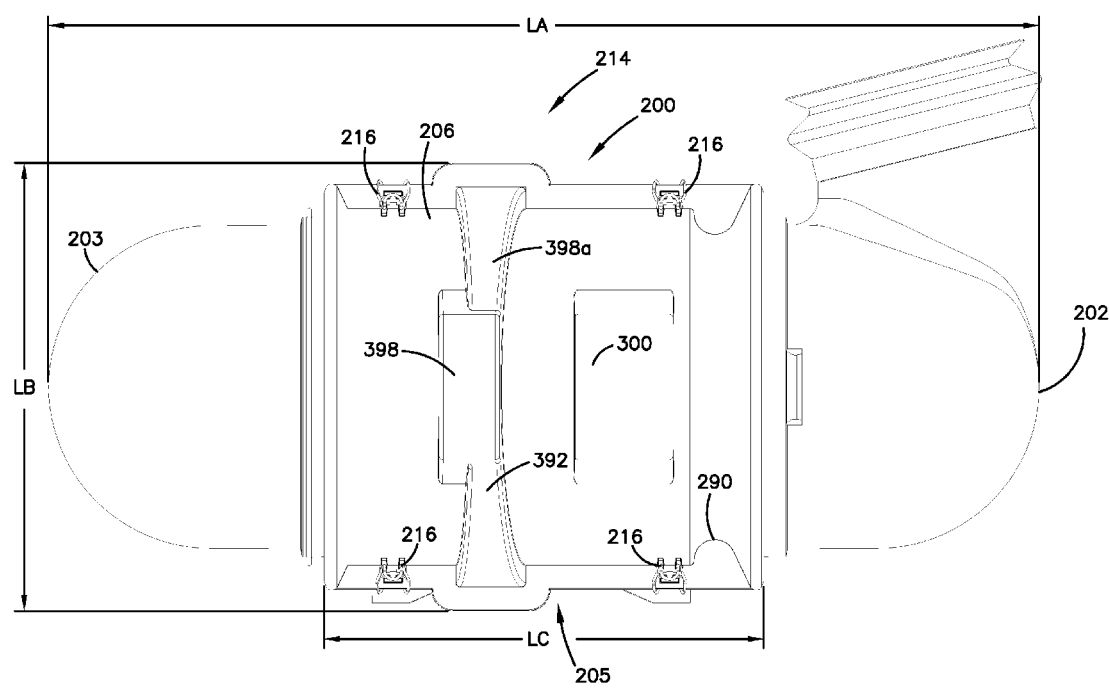
FIG. 22 is a side elevational view of the assemblies of FIGS. 20-21, with an access cover in place.

In FIG. 22, air cleaner 200 is depicted following positioning cartridge 350 (FIG. 21) with access cover 206 in place. The access cover 206 is secured in place by latches 216. The access cover 206 includes a receiver 398 positioned to receive handle member 354, FIG. 21, therein. The receiver 398 will be configured to prevent handle 354 for moving rearward, in the general direction of arrow 399, FIG. 21, which movement would dislodge the cartridge 350 from a proper sealing orientation. Thus, with an arrangement as depicted, the access cover 216 is configured to prevent the shorter cartridge 350 from backing out of secure engagement once installed. The access cover 206 further includes a groove shaped receiver 398a, as part of groove 392, to receive a portion of projections 374, 373 therein, when cover 206 is in place, again stabilizing the position of the cartridge 350.

In FIG. 22, the indicated, example, dimensions are as follows: LA=744.3 mm; LB=336.8 mm; and, LC=330.1 mm.

Figure 23:
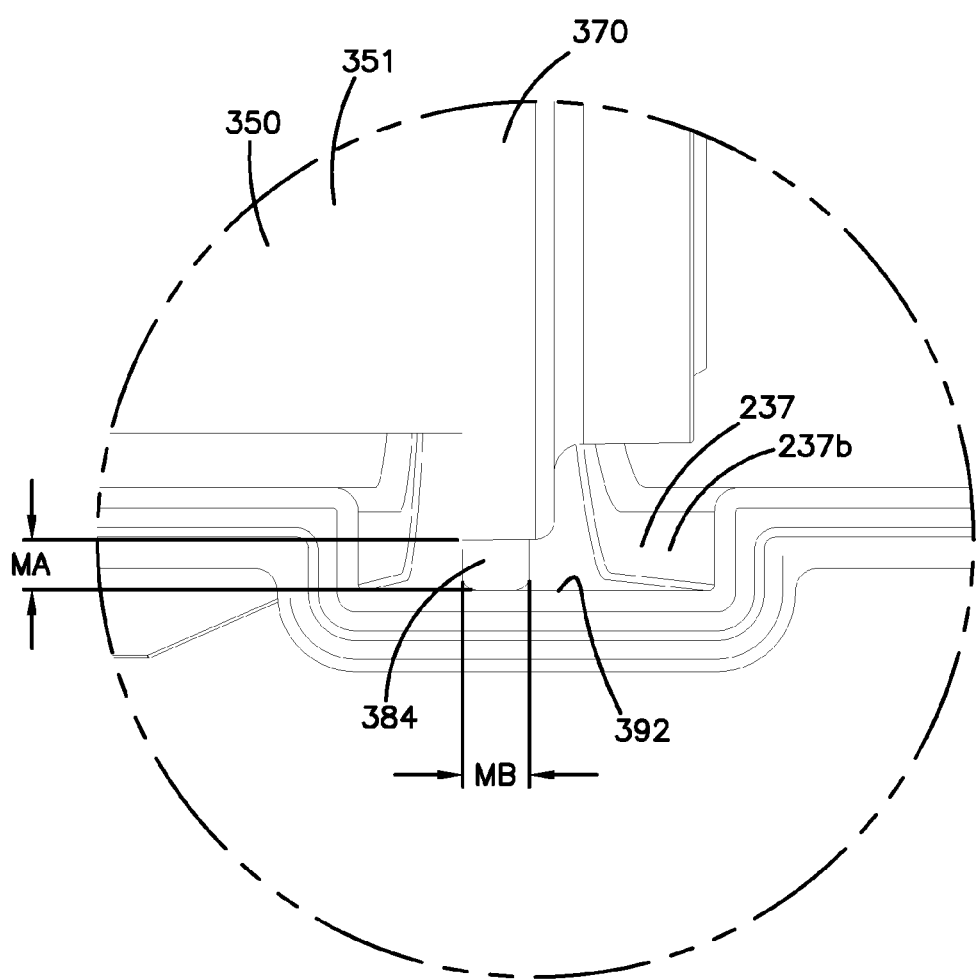
FIG. 23 is an enlarged fragmentary view of a portion of FIG. 20.

In FIG. 23, an enlarged fragmentary view of a portion of the assembly as depicted in FIG. 20 is shown. In FIG. 23, spacer 384 can be viewed helping to center and support the cartridge 350 in position, within receiver 392. Spacers 384, 383 can be shaped and be dimensionally analogous, to spacers 280, 281 discussed above, except modified to accommodate groove projection 392.

In FIG. 23 the indicated dimensions are as follows: MA=7.8 mm; MB=10.5 mm.

Figure 24:
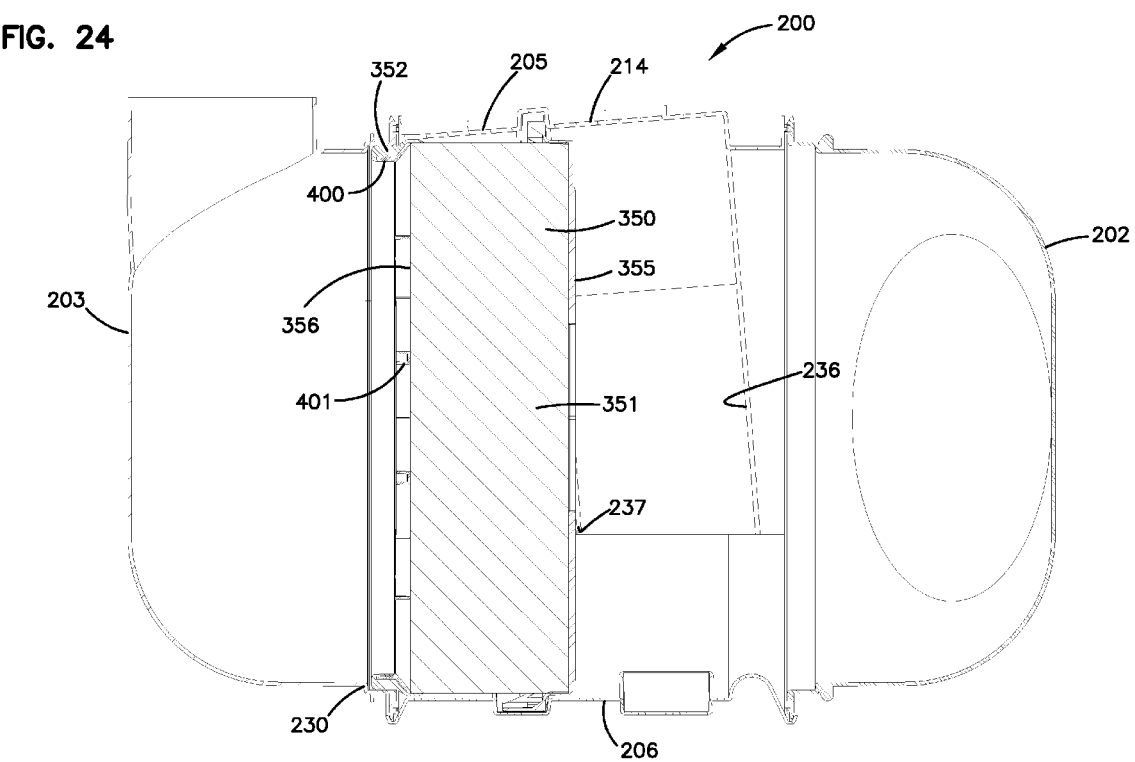
FIG. 24 is a cross-sectional view of the assembly of FIGS. 20-22, depicted with an access cover in position and from a cross-sectional view generally in accord with line 16-16, FIG. 15, but depicting the assembly with the shorter filter cartridge of FIGS. 19 and 20, in place.

FIG. 24, a cross-sectional view analogous to FIG. 16 is shown of the air cleaner 200, but depicting the smaller or shorter cartridge 350 in place. Housing seal arrangement 352 can be viewed as secured against housing seal track 230 by compressing the seal member 365 against support 400, support 400 projecting axially outwardly from face 356 in a direction opposite face 355. Grid work 401 extending across face 356 can be used to stabilize the media pack 351.

Referring again to FIG. 20, it is noted that the example handle arrangement 354 shown has designation different from handle arrangement 254, FIG. 12. Although alternatives are possible, the particular handle arrangement 354 depicted is configured to have one edge 354a, which faces toward outlet section 203, that is scallop-shaped for receiving fingertips, Further the edge 354a is positioned so that fingers can be pushed underneath it, to facilitate manipulation of cartridge 350. An edge 354b, opposite edge 354a, for the example shown, is closed, meaning it has no undercuts or similar structure, in a typical preferred arrangement. Alternatives are possible.

It is noted that the size of top 354c of handle arrangement 354 is generally smaller than a perimeter size of top 254c, of handle arrangement 254, FIG. 12. Variations from these definitions are possible, but the examples shown are typical.

D. Selected Structural Variations, System of Use and Example Seal Variations, FIGS. 25-32.

(a) Seal Variations, FIGS. 28-31.

Figure 28:
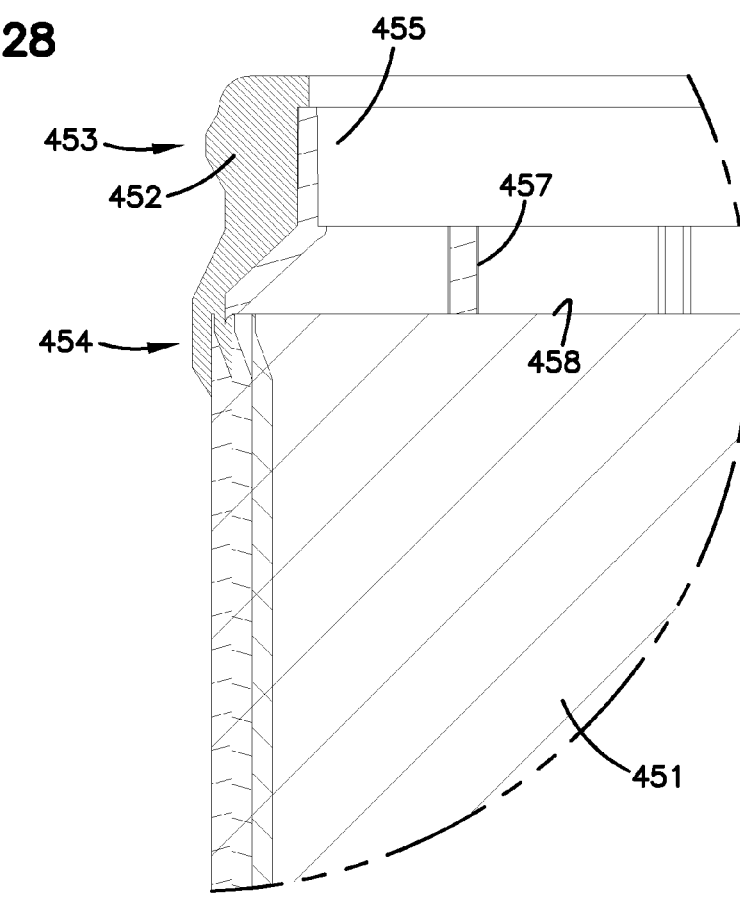
FIG. 28 is an enlarged fragmentary cross-sectional view of a portion of a filter cartridge useable in arrangements according to the present disclosure.

In FIGS. 28-31, some structure variations for the seal arrangements are discussed and shown. In FIG. 28 an example media pack 451 is depicted, which can correspond to either media pack 251 or media pack 351. A housing seal arrangement 452 is depicted comprising a seal member 453 with an integral portion 454. Support 455 for backing up the seal during compression is shown. The support 455 is secured to the media pack 451 by the overmold 454. Grid 457 is shown extending across media pack (downstream) flow face 458. The type of seal arrangement depicted in FIG. 28 is generally analogous to the ones depicted in previously discussed figures, and is discussed in detail in U.S. patent application Ser. No. 11/019,883 filed Dec. 21, 2004; and PCT Publication WO 05/63361, published Jul. 14, 2005, incorporated herein by reference.

Figure 29:
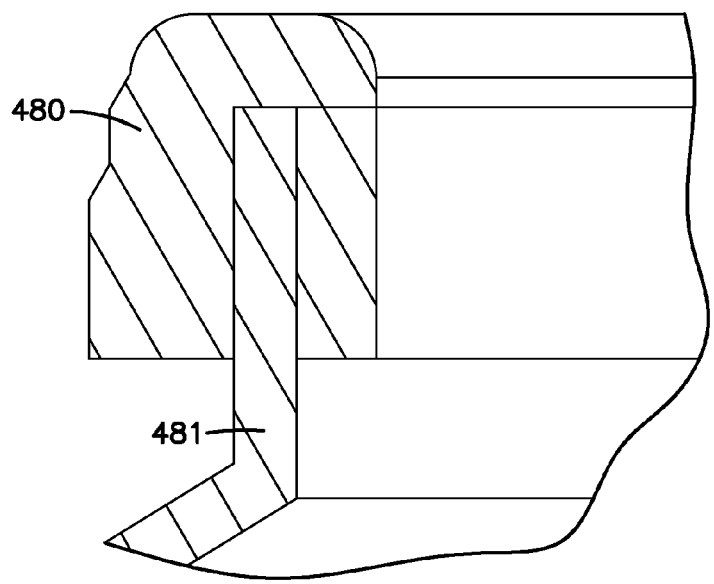
FIG. 29 is a cross-sectional view analogous to FIG. 28, depicting a first alternate seal arrangement.

In FIG. 29, an alternate arrangement is shown. Here seal member 480 is molded onto a support 481. The support 481 would be secured to the media pack by an adhesive or other material, but not by a structure integral with the seal arrangement 480. Thus for typical operation, the seal member 480 would be premolded onto the support 481, and then the combination would be secured to the media pack. Such seal arrangements are described for example in U.S. Pat. Nos. 6,783,565, 6,190,432, 6,350,291, 6,610,117, incorporated herein by reference. These principles can be applied with media packs installed in air cleaners according to the present disclosure.

Figure 30:
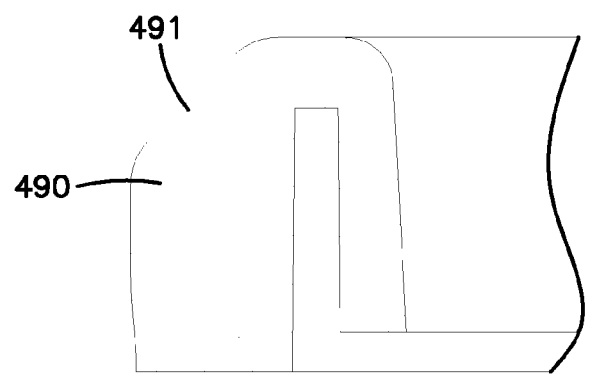
FIG. 30 is a fragmentary cross-sectional view depicting a second alternate seal arrangement.

In FIG. 30, a fragmentary view of a seal arrangement 490 including a single step or champfer section 491 is depicted. This configuration can be used as an alternate shape for the seal region for either the arrangements of FIG. 28 or FIG. 29. Such arrangements are described for example in U.S. Provisional Application 60/735,650, filed Nov. 9, 2005, incorporated herein by reference.

Figure 31:
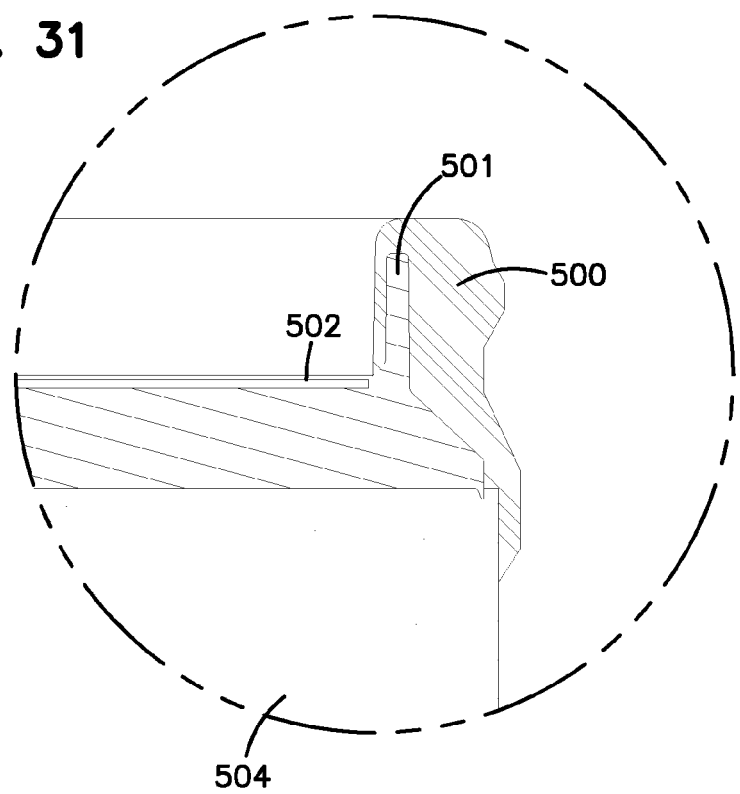
FIG. 31 is an enlarged fragmentary cross-sectional view depicting a third alternate seal arrangement.

Finally in FIG. 31, a housing seal arrangement 500 is depicted which utilizes a support 501 having a projecting lip 502 to manage sealing rise, during a molding operation. In FIG. 31, the media pack is shown at 504. Such an approach, which is a modification of the approach described in FIG. 28, is discussed in detail in U.S. Provisional Application 60/735, 650, filed Nov. 9, 2005, incorporated herein by reference.

An example polymeric material useable for housing the seal regions (and overmold is present) as described herein is polyurethane. An example useable polyurethane is a foamed polyurethane which will increase in volume during use. Preferred ones increase by at least 40% in volume, to fill the mold cavities (typically at least 80% in volume) and having an as-molded density of no greater than 30 lbs/cu.ft (0.48 g/cc), typically no greater than 22 lbs/cu.ft (0.35 g/cc) and usually with in the range of 10 lbs/cu.ft (0.16 g/cc) to 22 lbs/cu.ft (0.35 g/cc); and, a hardness (Shore A) typically of not greater than 30, preferably not greater than 25 and typically within the range of 10 to 22. Of course polyurethanes outside of this range can be used, but the characterized ones are advantageous for manufacturing and handling.

(b) Housing Variations and Use, FIGS. 25-27 and 32.

Figure 25:
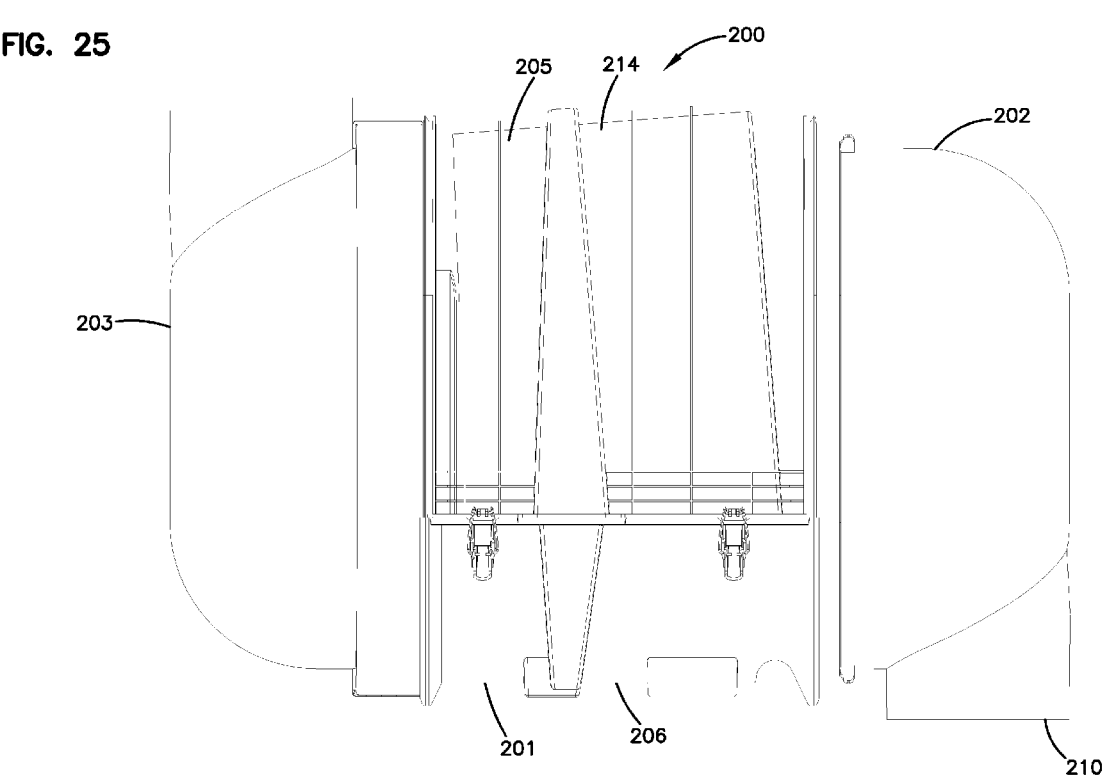
FIG. 25 is a schematic depiction of a modification in the air cleaner of FIG. 6, for a first side inlet.
Figure 26:
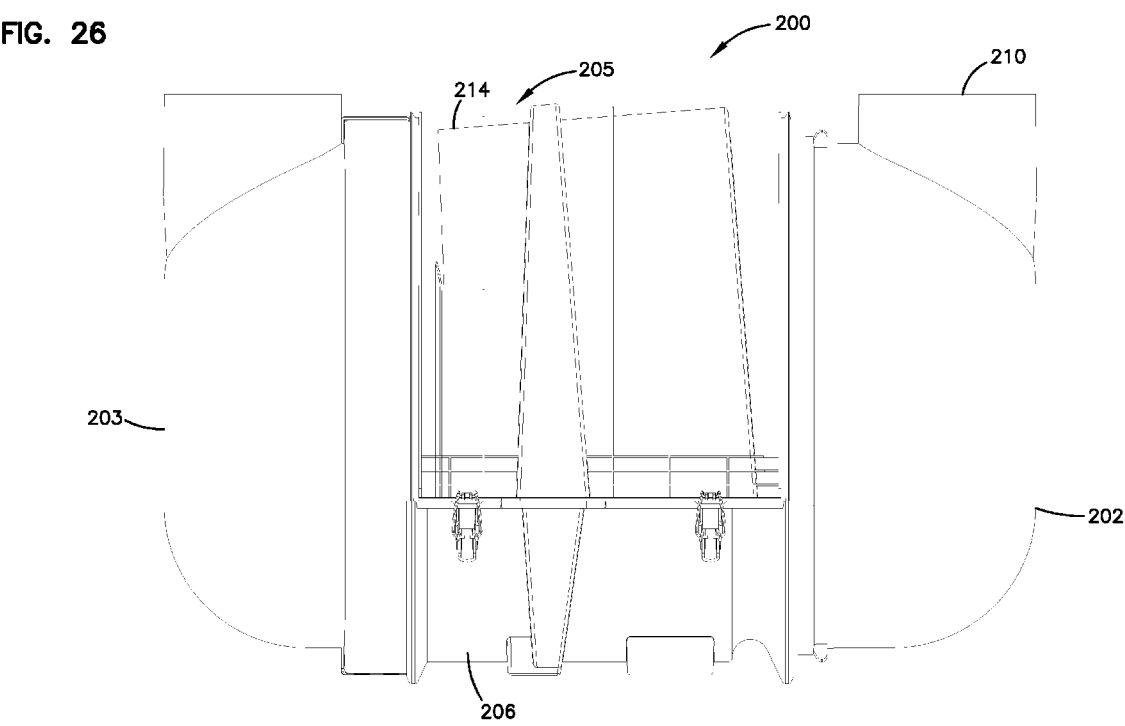
FIG. 26 is a schematic view of an assembly generally in accord with FIG. 25, with a second modified side inlet.

In FIGS. 25 and 26, variations in air cleaners are possible by the modular constructions are depicted. Referring first to FIG. 25, air cleaner 200 is depicted with inlet section 202, outlet section 203, center section 205 with base 214 and access cover 206. The inlet section 202 is provided with an inlet arrangement 210 which in this instance is a side inlet 210. In FIG. 26, an analogous structure is shown, with the side inlet 210 of inlet section 202) directed in an opposite direction. Modular construction allows for fitting the parts together in these alternate constructions.

In FIG. 27, a fragmentary, schematic depiction of an air cleaner 200 positioned under the hood 600 of a vehicle 601 is provided. The air cleaner 200 is positioned above the engine block 605. The particular air cleaner 200 depicted, includes bellows member 610 around inlet 611, positioned to engage structure 620 on the hood 600, during operation, when hood 600 is lowered. Of course as discussed above, alternatives are possible. From a review of FIG. 27, it will be apparent that the profile for the air cleaner 200 depicted in the various figures, is convenient for positioning above an engine block 605 and below a hood 600 of a vehicle such as a truck.

Figure 32:
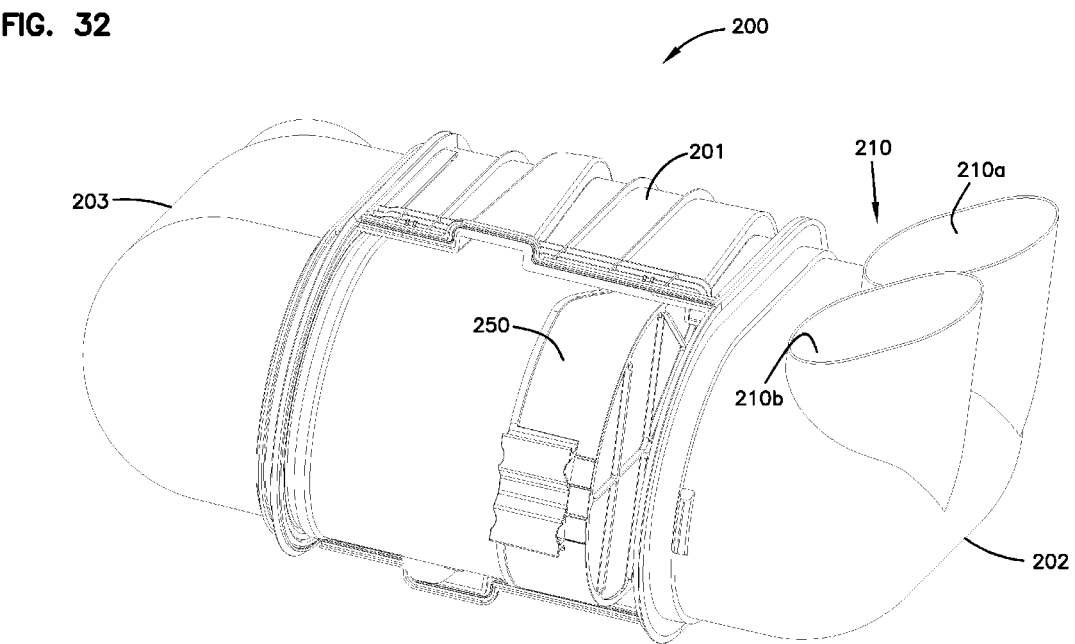
FIG. 32 is a view analogous to FIG. 13, but depicting an alternate dual inlet.

Referring to FIG. 32, air cleaner 200 is shown with housing 201 having cartridge 250 positioned therein, and an access cover removed. The air cleaner includes inlet section 202 and outlet section 203. The inlet section 202 is defined with dual inlet tubes in inlet arrangement 210, at 210a, 210b. The tubes 210a, 210b can be configured to receive inlet air from two different locations, for example from separate air intake vents on opposite sides of a vehicle.

E. Summary of Selected Features and Feature Combinations.

In general terms, herein above an air cleaner assembly is disclosed including a housing defining an interior and having: an air flow inlet section; air flow outlet section; primary filter cartridge receiving section between the air flow outlet section and the air flow inlet section; and, an access cover removably positioned on the primary filter cartridge receiving section. In an example shown, the housing also includes a primary filter cartridge housing radial seal surface, for sealing an installed filter cartridge in use.

The primary filter cartridge receiving section of the housing includes at least first and second primary filter cartridge biasing tracks. In the example shown, two biasing tracks are depicted, but it is described that more biasing tracks can be used.

A first one of the at least two primary filter cartridge biasing tracks is spaced, axially, first distance (D10) from the housing seal surface. A second one of the at least two primary filter cartridge biasing tracks is spaced axially a second distance (D20) from the housing radial seal surface. The first distance (D10) is greater than the second distance (D20). More generally phrased, the first primary filter cartridge biasing track is spaced from a region in which a cartridge arrangement seals to the housing (radially or otherwise) a first distance (D10) and the second primary filter cartridge biasing track is spaced from the same region a second distance (D20), with the distance (D10) being greater than the distance (D20). Thus the arrangement is configured to bias at least two different size cartridges into position with the same seal arrangement.

In general, the assembly includes a first removable and replaceable filter cartridge positioned within the housing. The filter cartridge comprises a media pack having opposite inlet flow and outlet flow faces. The media pack is typically a z-filter media pack comprising a plurality of inlet flutes and outlet flutes extending between the inlet flow face and the outlet flow face. The inlet flutes are open adjacent the inlet flow face and closed adjacent the outlet flow face; and, the outlet flutes are closed adjacent the inlet flow face and open adjacent the outlet flow face, in a typical z-pack arrangement. The media pack is closed to passage of unfiltered air therethrough, between the inlet and outlet flow faces, so that air entering the inlet flow face must pass through the media in order to exit adjacent the outlet flow face. The primary filter cartridge includes a housing seal member thereon. For a typical arrangement described herein, the housing seal member is positioned in radial seal engagement with the primary filter cartridge housing radial seal surface.

In at least one assembly, with a larger or longer filter cartridge, the filter pack would have an axial length extending from a location adjacent the housing radial seal surface to a location adjacent the first primary cartridge biasing track. By "adjacent" in this context, it is not meant that there is necessarily contact between the two described features.

In a second arrangement, the media pack would have an axial length extending from a location adjacent the first housing radial seal surface to a location substantially shorter than the first primary filter cartridge biasing track. In this instance, the cartridge would typically be installed using the second primary filter cartridge biasing track. Typically when installed with the second primary filter cartridge biasing track, the cartridge has an axial length of at least 40 mm, typically at least 60 mm, and usually at least 80 mm, and often 100-200 mm shorter than a distance between the housing radial seal surface and the first primary filter cartridge biasing track.

In general terms, an air cleaner assembly as disclosed, include primary filter cartridges (whether configured to use the first biasing track or the second biasing track) which include a preform support mounted on an end of the media pack opposite the housing seal member. The preform support includes a guide arrangement positioned to slidably engage a selected one of the at least two biasing track, during installation. In one example shown, the guide arrangement comprises an end edge of the preform support adjacent the inlet face. This type of arrangement, for the example shown, is used to engage the first primary filter cartridge biasing track, when that biasing track is positioned the furthest from the housing radial seal surface, of any of the biasing tracks.

In selected examples shown herein, the guide arrangement comprises a side projection or flange arrangement projecting radially outwardly from sides of the preform support location spaced at least 5 mm, typically at least 10 mm, usually at least 15 mm, for example 15-30 mm, from the inlet face toward the outlet face. Such a guide arrangement is not configured for engagement with a typical first biasing track as described herein, but rather is positioned for engagement with a second biasing track that accommodates a shorter filter cartridge than the first biasing track.

In typical arrangements, the air cleaner assembly is configured such that the access cover includes a primary filter cartridge engagement and retainment arrangement thereon. An example features of a primary filter cartridge engagement and retainment arrangement, is a projection on the cover which extends interiorly of the air cleaner, to a location behind a primary filter cartridge. Such an arrangement is shown and described in which the projection on the access cover is positioned to project to a location behind a primary filter cartridge that is installed utilizing the first biasing track, i.e., the longer possibility for a primary filter cartridge.

Other features of a primary filter cartridge engagement and retainment arrangement in the access cover, include spaced handle arrangement receivers in the access cover, each of which is sized and located to engage handle member on one of the possible primary filter cartridges for installation.

Another example feature of a primary filter cartridge engagement and retainment arrangement on the access cover, is a groove or trough for engagement with a projection on one of the possible filter cartridges.

In an example shown, the first biasing track within the primary filter cartridge receiving section has a u-shaped slide surface facing generally toward the air flow outlet and facing generally away from the air flow inlet section. This first u-shaped slide surface includes side tips projecting toward the access cover and a center projecting away from the access cover. This first u-shaped slide surface is typically planar and is positioned at plane, at an acute angle X, from a plane perpendicular to flow direction between the inlet section and the outlet section by at least 0.5°, typically 2°-10°. A typical arrangement is with the tipping such that the side tips of the first u-shaped slide surface is spaced further from the outlet section than the center of the u-shaped slide surface.

In example arrangements described herein, the biasing track also has a u-shaped slide surface with side tips projecting toward the access cover and a center projecting away from the access cover. The second u-shaped slide surface in an example shown is planar is angled in an angle Y from a plane perpendicular to flow direction between the inlet section and the outlet section, by at least 0.5°, with the side tips further from the outlet section than a center of the u-shaped slide surface.

Typically the angle X is different from the angle Y, usually the angle X is at least 0.5° larger than angle Y. The angle Y is typically within the range of 2° to 10°, inclusive.

Typically a direct distance between side tips of the first u-shaped slide surface is smaller than a direct distance between side tips of the second u-shaped slide surface. In this context the term "direct" is meant to refer to a shortest distance between the tips, as opposed to a distance that extends along the curve of the u-shape.

Typically a second biasing track is an interior slide surface of the u-shaped outward projection or trough, in the primary cartridge receiving section of the housing.

Herein, various air filter cartridges are described for use in the air cleaner assembly. A typical air filter cartridge comprises a z-filter media pack as previously characterized. Typically that media pack has a perimeter shape with two opposite curved ends and two opposite sides extending therebetween, an example being oval and a specific example being racetrack as characterized herein. The principles can be utilized with other types of perimeter shapes, but the example shown utilize a shape as characterized.

A preform support is positioned on the media pack adjacent the inlet flow face. The preform support includes a handle arrangement thereon positioned overlapping one of the curved ends of the media pack. The preform support includes first and second opposite side spacer projections overlapping opposite sides of the media pack. Each one of the first and second side spacer projections typically has a length of extension corresponding to 5% to 40% of the maximum width of the media pack between the first and second curved ends, although alternatives are possible. By the term "maximum width" herein, it is meant to the larges distance across the media pack outside surfaces of the curved ends.

In typical filter cartridge of the type characterized, each one of the first and second side spacer projections has a radial outward projection of at least 2 mm, typically 3-15 mm, inclusive, relative to adjacent portions of the preform support. Also each one of the first and second side spacer projections typically has an axial thickness of at least 6 mm, and each one of the first and second side spacer projection is spaced at least 10 mm from an inlet end face of the media pack.

It is noted that the side spacer projections can be positioned on projections that include an axial surface for engagement with a slide track, although alternatives are possible. It is also noted that spacer projections can be continuous, however alternatives are possible.

In one example, the handle arrangement includes a lip projection directed axially toward the outlet face under which fingers can be placed, in a closed end (preventing fingers being placed thereunder) directed axially toward the inlet face.

What is claimed is:

1. An air filter cartridge comprising:
   (a) a media pack having an inlet flow face and an opposite outlet flow face;
      (i) the media pack comprising a coiled strip of fluted filter media secured to facing filter media defining a plurality of inlet flutes and outlet flutes extending between the inlet and outlet faces;
      (ii) the media pack being closed to passage of unfiltered air therethrough, between the inlet flow face and the outlet flow face; and
      (iii) the media pack having a perimeter shape with two opposite curved ends with opposite sides extending therebetween;
   (b) a housing seal member mounted on the media pack adjacent the outlet flow face and including a radially outwardly radial seal member; and,
   (c) a preform support positioned on the media pack adjacent the inlet flow face;
      (i) the preform support including a handle arrangement thereon positioned overlapping one of the curved ends of the media pack;
      (ii) the preform support including first and second opposite side spacer projections overlapping opposite sides of the media pack;
         (A) each one of the first and second side spacer projections having a length of extension corresponding to 5% to 40% of a maximum width of the media pack between the first and second curved ends;
         (B) each one of the first and second side spacer projections having a radial outward projection of 3 to 15 mm, relative to adjacent portions of the preform support;
         (C) each one of the first and second side spacer projections having an axial thickness of at least 6 mm; and,
   (b) a housing seal arrangement mounted on the media pack adjacent the outlet flow face and including a radially outwardly directed radial seal member;
      (i) the housing seal arrangement comprising a support projecting outwardly from the outlet flow face in a direction opposite the inlet flow face;
      (ii) the housing seal arrangement including grid work extending across the outlet flow face; and,
   (c) a preform support positioned on the media pack adjacent the inlet flow face and spaced from, and separate from, the housing seal arrangement;
      (i) the preform support completely surrounding an end of the media pack and including first and second, opposite, sides extending between first and second, opposite, curved ends;
      (ii) the preform support including a handle arrangement thereon positioned overlapping one of the curved ends of the media pack and projecting away from the media pack;
         (A) the handle projection having at least one edge positioned so that fingers can be pushed at least partially beneath it, to facilitate manipulation of the cartridge; and,
      (iii) the preform support including housing engagement projections on the first and second, opposite, sides;
         (A) the housing engagement projections being spaced from the handle projection;
         (B) the housing engagement projections being spaced from the inlet flow face; and,
         (C) the housing engagement projections being formed integral with a remainder of the preform support.

2. An air filter cartridge according to claim 1 wherein:
   (a) the preform support includes a radial slide projection thereon, positioned at least 15 mm from the inlet face;
      (i) the slide projection having opposite sides and a center;
         (A) the center projecting outwardly from the preform overlapping a curved end of the media pack opposite from the handle arrangement;
         (B) the opposite sides and center defining a slide surface directed axially toward the outlet face; the slide surface having a width of at least 5 mm; and,
      (ii) the first and second side spacer projections being positioned on the opposite sides of the slide projection.

3. An air filter cartridge according to claim 1 wherein:
   (a) the handle arrangement includes an edge directed axially toward the outlet face and a closed end directed axially toward the inlet face.

4. An air filter cartridge comprising:
   (a) a media pack having an inlet flow face and an opposite outlet flow face;
      (i) the media pack comprising a coiled strip of fluted filter media secured to facing filter media and defining a plurality of inlet flutes and outlet flutes extending between the inlet and outlet faces;
      (ii) the media pack being closed to passage of unfiltered air therethrough between the inlet flow face an the outlet flow face; and,
      (iii) the media pack having a perimeter shape with two opposite curved ends and with opposite sides extending between the two opposite curved ends;

(a) the preform support projects further toward the outlet flow face, in a region adjacent the handle arrangement, than it does in a region opposite the handle arrangement.

5. An air filter cartridge according to claim 4 wherein:
(a) the preform support includes a grid extending across the inlet flow face.

6. An air filter cartridge according to claim 5 wherein:
(D) each one of the first and second side spacer projections being spaced a distance of at least 10 mm, from the inlet end face of the media pack.

7. An air filter cartridge according to claim 4 wherein:
(a) at least one edge of the handle projection, that is positioned so that fingers can be pushed at least partially beneath it, is directed toward the outlet flow face.

8. An air filter cartridge according to claim 4 wherein:
(a) at least one edge of the handle projection, that is positioned so that fingers can be pushed at least partially beneath it, is directed toward a side of the cartridge and not toward either the inlet flow face and the outlet flow face.

9. A filter cartridge according to claim 8 wherein:
(a) each one of the first and second side spacer projections has a length of extension corresponding to 5% to 40% of a maximum width of the media pack between the first and second curved ends.

10. A filter cartridge according to claim 4 wherein:
(a) the preform support comprises first and second, opposite, side spacer projections overlapping opposite sides of the media pack;
  (i) each one of the first and second side spacer projections having a radial outward projection of 3 to 15 mm, relative to adjacent portions of the preform support;
  (ii) each one of the first and second side spacer projections having an axial thickness of at least 6 mm; and,
  (ii) each one of the first and second side spacer projections being spaced a distance of at least 10 mm, from the inlet end face of the media pack.

11. An air filter cartridge according to claim 4 wherein:
(a) the preform support includes a radial slide projection thereon, positioned at least 15 mm from the inlet face;
  (i) the slide projection having opposite sides and a center;
    (A) the center projecting outwardly from the preform overlapping a curved end of the media pack opposite from the handle arrangement; and,
    (B) the opposite sides and center defining a slide surface directed axially toward the outlet face; the slide surface having a width of at least 5 mm; and,
  (ii) the first and second side spacer projections being positioned on the opposite sides of the slide projection.

12. A filter cartridge according to claim 4 wherein:
(a) the preform support comprises first and second opposite side spacer projections overlapping opposite sides of the media pack;
  (i) each one of the first and second side spacer projections having a radial outward projection of 3 to 15 mm, relative to adjacent portion of the preform support; and,
  (ii) each one of the first and second side spacer projections having an axial thickness of at least 6 mm.

13. An air cleaner assembly comprising:
(a) a housing having an interior and having: an air flow inlet section; an air flow outlet section, a primary filter cartridge receiving section between the air flow outlet section and the air flow inlet section; an access cover removably positioned on the primary filter cartridge receiving section; and, a primary filter cartridge housing radial seal surface; and,
(b) a cartridge in accord with claim 4 removably positioned with in the housing with the radial seal member thereon in radial sealing engagement with the primary filter cartridge housing radial seal surface.

14. An air cleaner assembly according to claim 13 wherein:
(a) the handle arrangement on the preform support is received in a receiver in the access cover.

15. An air cleaner assembly according to claim 14 wherein:
(a) a housing projection on the first side of the cartridge is positioned projecting a recess in the housing; and,
(b) a housing projection on the second side of the cartridge is positioned projecting into a recess in the housing.

* * * * *